United States Patent [19]

Loy et al.

[11] 3,957,092

[45] May 18, 1976

[54] APPARATUS FOR FORMING TWISTED PAIRS OF CONDUCTOR WIRE

[75] Inventors: Fred W. Loy, Whitehall; William J. Harms, Nunica; Charles W. Wojahn, Holland; Frederick Karasinski, Grand Rapids, all of Mich.

[73] Assignee: Gardner-Denver Company, Dallas, Tex.

[22] Filed: June 30, 1975

[21] Appl. No.: 591,580

Related U.S. Application Data

[60] Continuation of Ser. No. 462,691, April 22, 1974, abandoned, which is a division of Ser. No. 236,413, March 20, 1972, Pat. No. 3,827,465.

[52] U.S. Cl. .............................. 140/115; 140/149
[51] Int. Cl.² ............................................ B21F 7/00
[58] Field of Search ............ 140/115, 149; 57/156, 57/92, 55.5

[56] References Cited
UNITED STATES PATENTS

| | | | |
|---|---|---|---|
| 539,139 | 5/1895 | Lee | 140/149 |
| 619,782 | 2/1899 | Noyes | 140/149 |
| 1,382,258 | 6/1921 | Turgeon | 140/149 |
| 2,835,283 | 5/1958 | Thone et al. | 140/149 |
| 3,182,690 | 5/1965 | Ransom | 140/115 |
| 3,616,531 | 11/1971 | Tyler | 140/149 |
| 3,750,720 | 8/1973 | Steigerwald | 140/149 |

Primary Examiner—Lowell A. Larson
Attorney, Agent, or Firm—Michael E. Martin

[57] ABSTRACT

Apparatus for forming twisted pairs of electrical conductor wire cut to predetermined lengths and having one wire end of a pair longitudinally offset from the adjacent end of the other wire of the pair. The apparatus includes plural wire preparation units which operate to cut predetermined lengths of wire and strip insulation from one or both ends of each wire. The wire preparation units are operable to feed prepared wires to a rotary wire carrier which includes a plurality of pairs of side by side elongated wire receiving tubes. The wire carrier is rotatably indexable from a wire receiving position to a position where a wire offsetting device comprising a fluid operated clamp and linear actuator operates to longitudinally offset one wire of a pair of wires prior to a twisting operation. The wire carrier is further indexable to a position wherein a pair of wires becomes engaged with a wire tensioning device and the adjacent ends of a pair of wires are gripped by a twisting and pulling apparatus. The twisting and pulling apparatus includes a linearly movable carriage having a pair of rotatable gripping jaws which grip adjacent ends of a pair of wires and withdraw the wires from the wire carrier tubes through the tensioning device while rotating. The combined linear and rotary movement of the gripping jaws is controlled to impart a predetermined number of twists to a wire pair.

3 Claims, 22 Drawing Figures

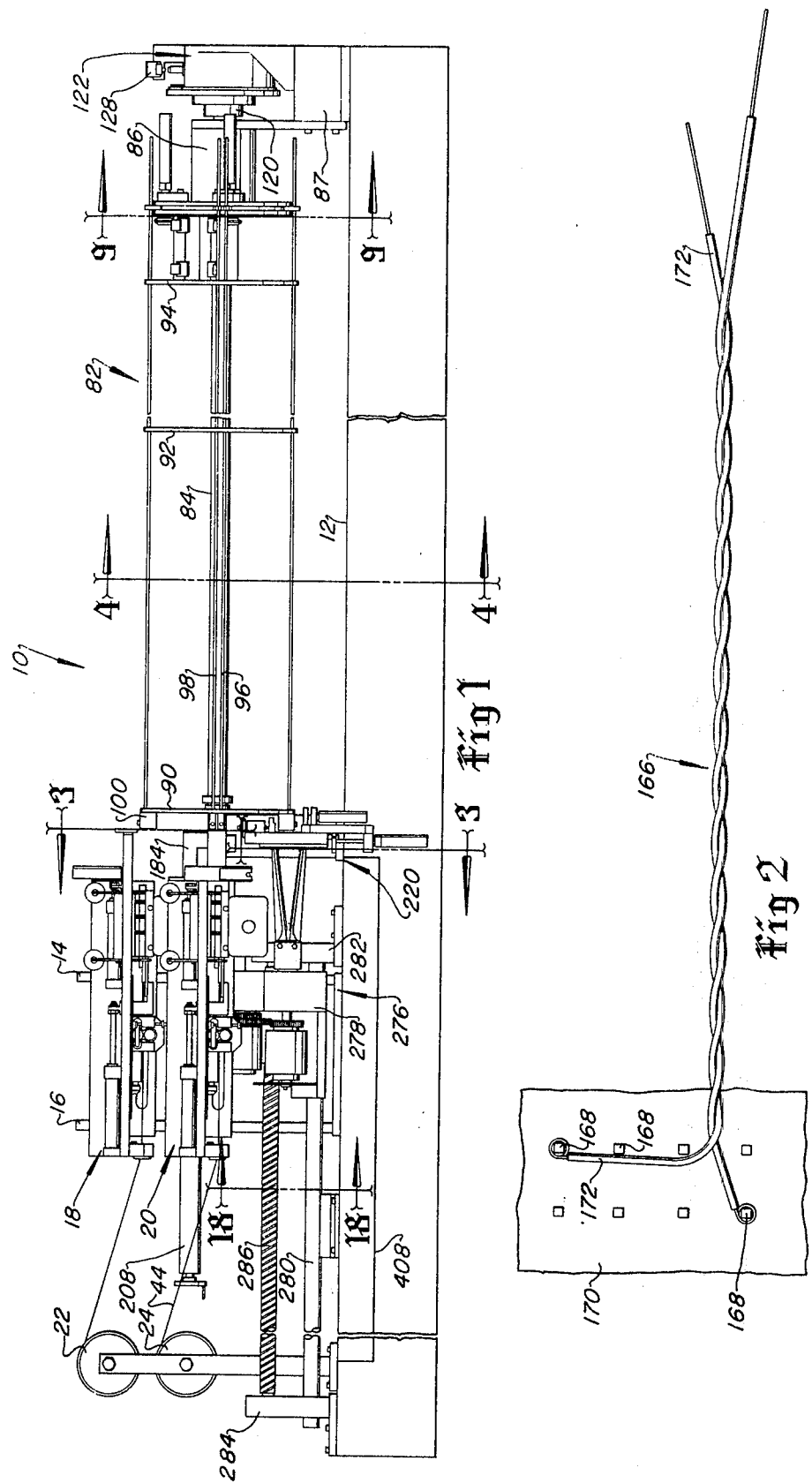

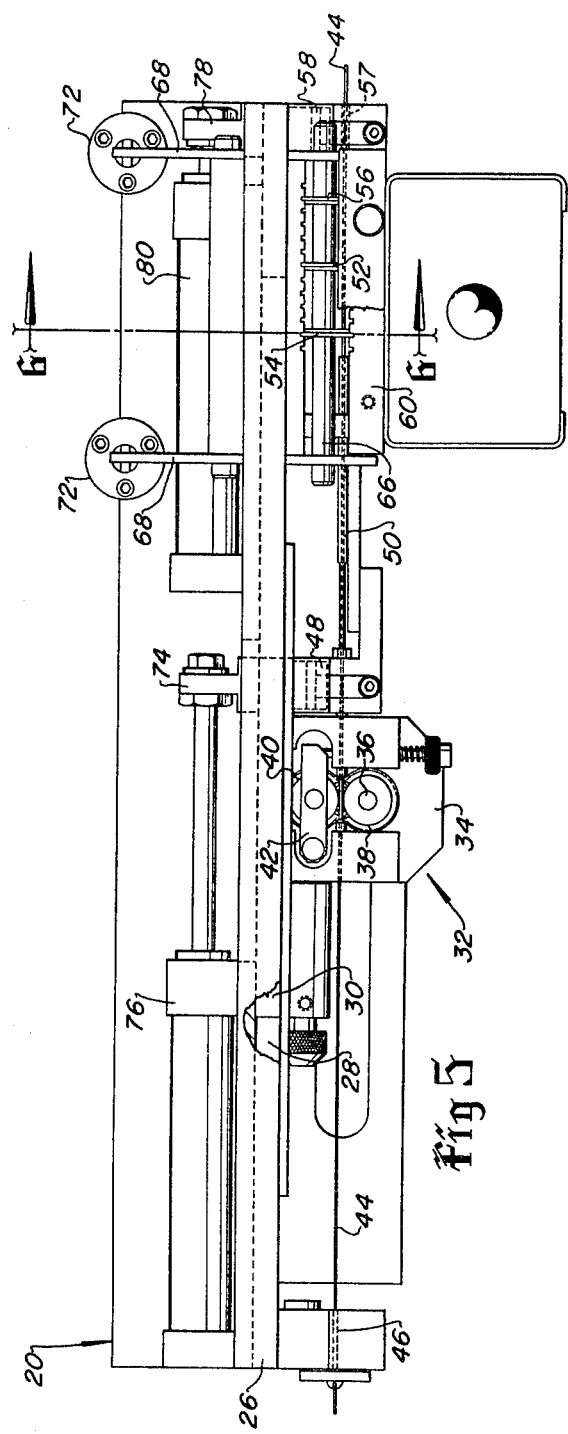

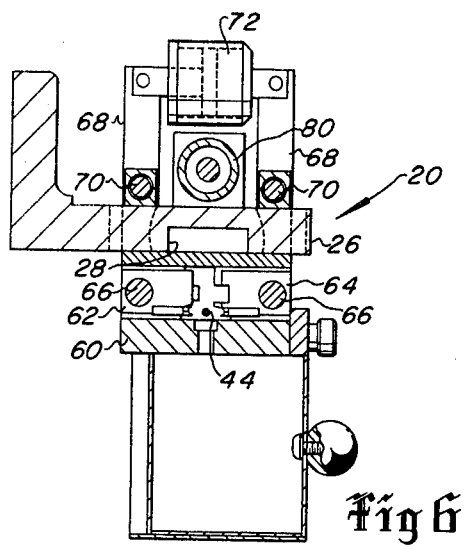
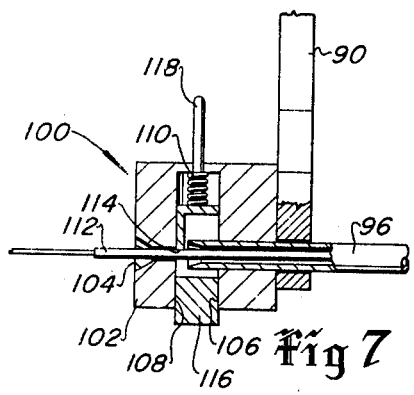
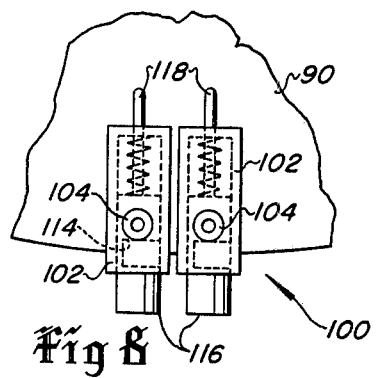
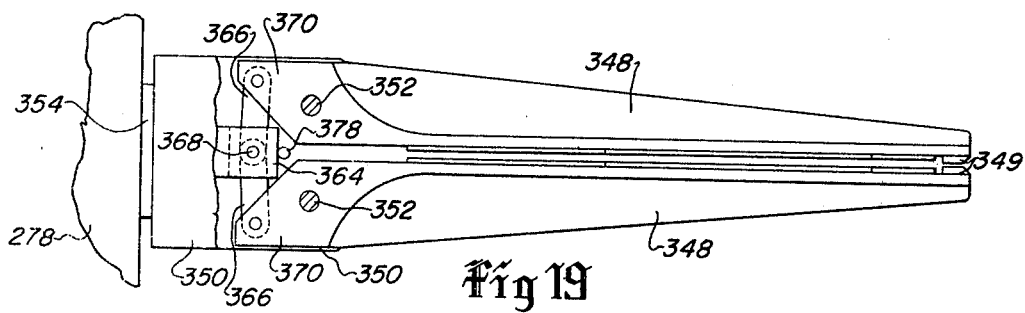

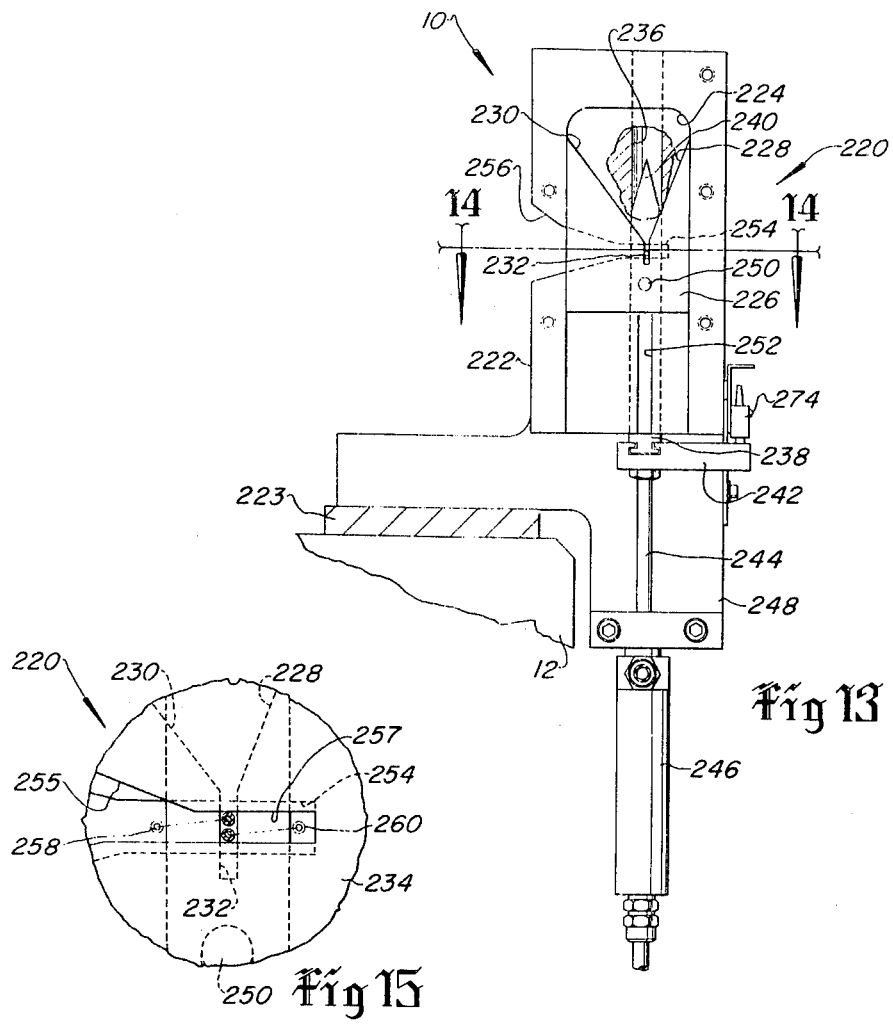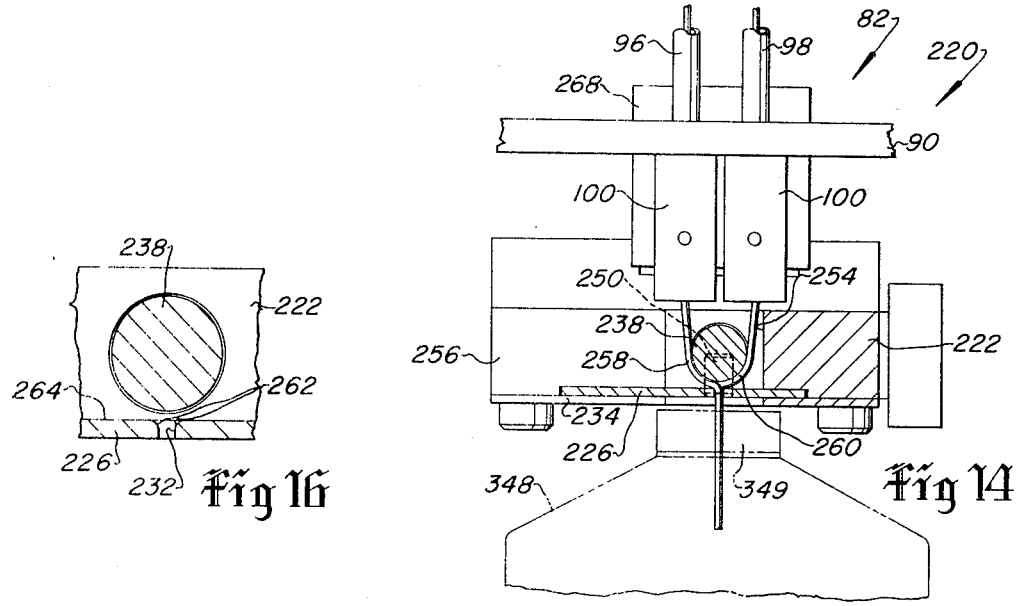

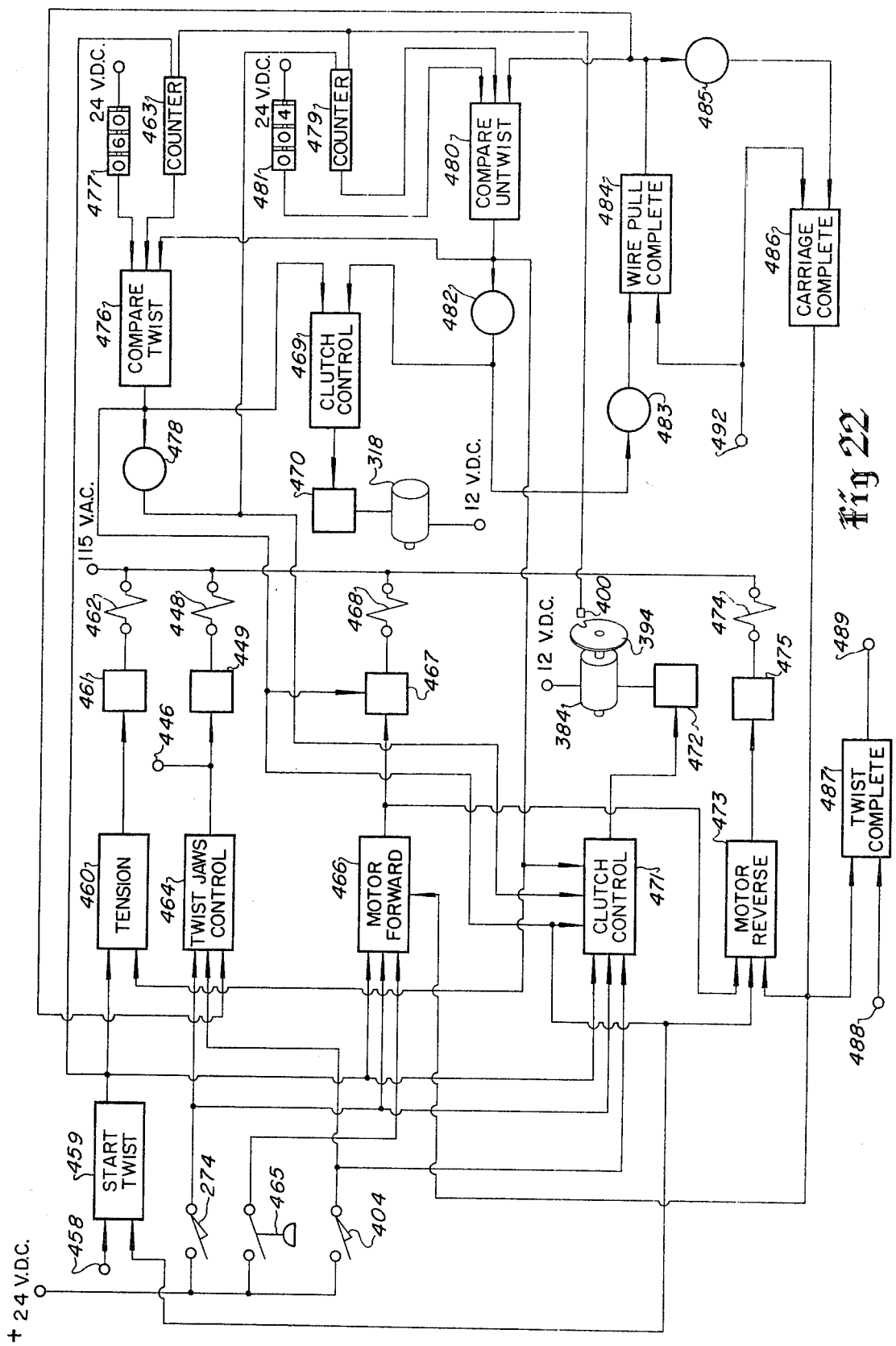

APPARATUS FOR FORMING TWISTED PAIRS OF CONDUCTOR WIRE

This is a continuation of application Ser. No. 462,691, filed Apr. 22, 1974, now abandoned, which is a division of application Ser. No. 236,413, filed Mar. 20, 1972, now U.S. Pat. No. 3,827,465.

BACKGROUND OF THE INVENTION

It is known in the art of electrical circuitry design that the placement of signal carrying conductors in close proximity to one another often causes certain signal interference problems. Such signal interference is due to the electromagnetic field generated by the signal carried by one conductor inducing an unwanted signal in a closely adjacent conductor in accordance with known physical principles. Such signal interference, sometimes known as "crosstalk," is particularly troublesome in designing circuitry for electronic communications and data processing equipment. A desired way of eliminating the aforementioned type of signal interference is to design circuits wherein the conductors are arranged as pairs of wires twisted one around the other, one wire being the signal carrying wire and the other wire being the circuit completing or ground wire.

In electronic circuits using conductor wires connected to terminals by wrapping the wire end in a series of helical convolutions on the terminal, or by using mechanical connectors it is necessary to prepare pairs of twisted wires having insulation removed from the end portions. Heretofore, twisted wire pairs or other twisted multiple wire conductors have been prepared by manually cutting and stripping insulation from pretwisted pairs of wires or from twisted pairs supplied in one continuous bulk quantity. Such manual preparation of wire pairs for complicated electrical circuits is costly and undesirably slow. Moreover, the correct length of wire and the correct length of the stripped portion of the wire is difficult to achieve consistently with manual operations.

It is also a problem in the preparation of twisted pairs of conductor wires to rapidly and accurately provide precut lengths of twisted pairs wherein one wire end is offset longitudinally with respect to the adjacent end of the other wire of a pair. Longitudinal offset is required in many circuits due to the location of the respective terminals to which the individual wires of a twisted pair are to be connected and due to the routing of the wire on the terminal board. The use of twisted pairs of conductor wires in increasing quantities for assembling electrical circuits has presented a need for apparatus which can rapidly and accurately prepare quantities of twisted multiple conductor wires cut to predetermined lengths with insulation removed from the wire ends, and with adjacent ends offset longitudinally one from another.

SUMMARY OF THE INVENTION

The present invention provides apparatus for forming twisted multiple conductor wires of predetermined length, and having a predetermined length of insulation cut and stripped from the respective wire end portion, if desired. The apparatus of the present invention includes a plurality of wire cutting and insulation stripping units which can be controlled to cut predetermined lengths of wire and to strip predetermined lengths of insulation from the ends of said lengths of wire. The apparatus of the present invention also includes a wire carrier which is operable to receive individual wires cut by the cutting and stripping units and transport pairs of cut wire lengths to a wire twisting apparatus wherein a pair of twisted conductor wires may be formed having a predetermined number of twists per unit length and having a predetermined twisted length.

The apparatus of the present invention further includes means for longitudinally offsetting the ends of one wire of a pair of wires with respect to the other wire of the pair. Accordingly, with the apparatus of the present invention pairs of twisted wires may be prepared with or without insulation stripped from the respective wire ends. The twisted pairs of wires may be formed to be of equal length with or without longitudinal offset of the wire ends. The twisted pair of wires may also be prepared to be of unequal length with longitudinal offset at one end of the pair, or with equal or unequal offset at both ends of the pair.

Further, according to the present invention apparatus is provided which is operable to twist a pair of conductor wires one about the other in a predetermined number of twists and in a predetermined number of twists per unit length. With the apparatus of the present invention the number of twists per unit length of wire may be varied in accordance with the requirements for certain wire diameters and types of insulation so as to prevent unwanted detwisting during circuit assembly operations.

The present invention also provides apparatus which may be controlled to form twisted pairs of wires in a substantial range of wire length and with variable amounts of wire end offset. Moreover, the present invention provides an improved method of preparing twisted pairs of conductor wire which is faster and produces more accurately formed pairs of wire than heretofore known processes.

BRIEF DESCRIPTION OF THE DRAWINGS

FIG. 1 is a longitudinal elevation of an apparatus for forming twisted pairs of conductor wires according to the present invention;

FIG. 2 is a plan view of a portion of an electrical terminal board with a twisted pair of conductor wires attached thereto;

FIG. 5 is a longitudinal elevation of one of the wire cutting and stripping units;

FIG. 6 is a view taken along the line 6—6 of FIG. 5;

FIG. 7 is a longitudinal section view through one of the wire carrier tubes and its associated wire retaining clamp;

FIG. 8 is a fragmentary end view of the wire carrier means showing two adjacent wire retaining clamps;

FIG. 13 is a view taken along the line 13—13 of FIG. 12;

FIG. 14 is a section view taken along the line 14—14 of FIG. 13;

FIG. 15 is a detail view on a larger scale of a portion of FIG. 13;

FIG. 16 is a detail view on a larger scale of a portion of FIG. 14;

FIG. 19 is a detail view of the wire twisting jaws; and,

FIGS. 20 through 22 are schematic diagrams of a control circuit for the apparatus of the present invention.

DESCRIPTION OF THE PREFERRED EMBODIMENT

Figure 3:
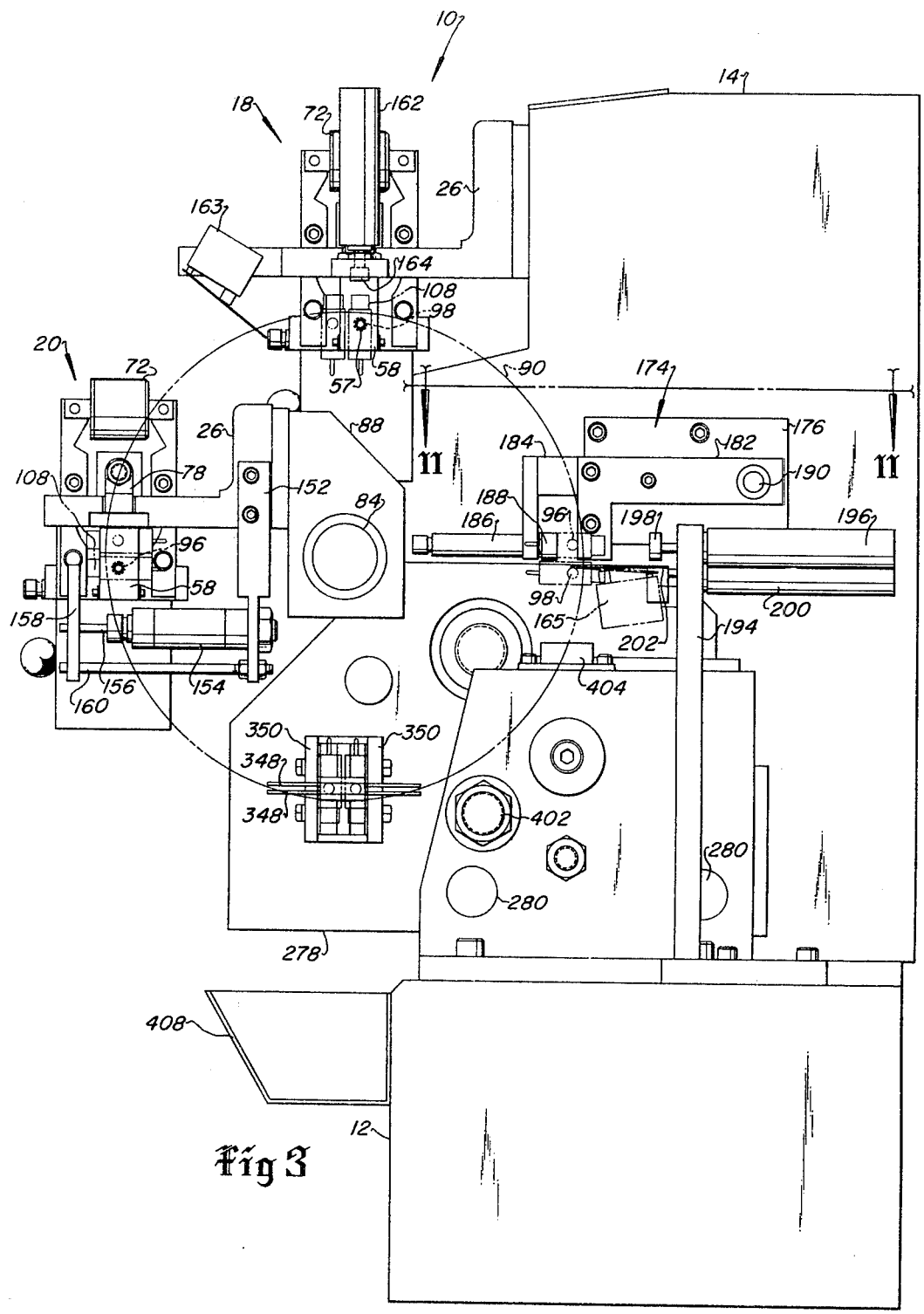
FIG. 3 is a transverse elevation taken substantially along the line 3—3 of FIG. 1.

Referring to FIG. 1 of the drawings an apparatus for forming twisted pairs of conductor wires is shown and generally designated by the numeral 10. The apparatus 10 comprises an elongated base 12 having mounted thereon a pair of spaced apart unstanding support members 14 and 16, see FIG. 3 also. Mounted on the support members 14 and 16 are two conductor wire cutting and insulation stripping units generally designated by the numerals 18 and 20. The units 18 and 20 will be referred to hereinafter as the wire strippers 18 and 20. Each wire stripper is adapted to receive insulated conductor wire from the respective bulk reels 22 and 24, suitably mounted on the base 12, and to supply predetermined lengths of wire with predetermined lengths of insulation stripped from each end. The wire strippers shown in use as part of the apparatus 10 are of a known type and are essentially the same in construction and operation as a machine which is commercially available from the assignee company of the present invention and designated as the Model 14YA Wire Preparation Unit. Similar types of wire strippers which could be adapted to be used with the apparatus 10 are disclosed in U.S. Pat. Nos. 2,884,825; 3,103,735; and 3,612,111. A general description only of the wire strippers 18 and 20 will be made herein to facilitate understanding of how they work in conjunction with the apparatus 10.

Referring to FIG. 5 and 6 the stripper 20 includes a frame 26 having a longitudinal slot 28 formed on the lower side. A slide member 30 mounted in the slot 28 and suitably retained therein supports a wire feed mechanism 32 comprising an electrical rotary stepping motor 34 having a shaft 36. The stepping motor 34 is of a known type, commercially available, which is responsive to rotate a predetermined amount when energized by an electrical signal and is precisely braked when deenergized to give positive rotary position control of the shaft 36. Attached to the shaft 36 is a combination feed wheel and gear 38, the gear portion of which is engaged with an adjacent combination feed wheel and gear 40. The feed wheel 40 is rotatably mounted on a pivoted support 42. Insulated conductor wire 44 is trained through a guide 46 and between the wheels 38 and 40 which grip the wire and, in response to operation of the stepping motor 34 feed the wire to the right viewing FIG. 5. The wire 44 passes through a fluid operated releasable clamp 48 mounted on the slide 30 and through a guide tube 50 to a wire cutting blade assembly 52 and insulation cutting blade assemblies 54 and 56. The wire 44 then passes through a passage 57 in a second fluid operated releaseable clamp 58.

The wire and insulation cutting blade assemblies are similar in construction with the exception that the insulation cutting blades cut only through the insulation and not the conductor wire. The blade assemblies 52, 54 and 56 are slidably mounted in suitable slots in a blade support frame 60. FIG. 6 illustrates the arrangement of the insulation cutting blade assembly 54 which is typical of all three of the blade assemblies. The blade assembly 54 includes a pair of opposed cutting blades 62 and 64 each connected to an elongated pin 66. The pins 66 are connected to pairs of arms 68 which are pivotally mounted on the frame 26 at 70. The arms are also connected to a fluid operated linear actuator 72. As shown in FIG. 5 two actuators 72 and sets of arms are provided for actuating the blades. In response to pressure fluid being supplied to the actuators 72 from a suitable source through control means, not shown, the blade assemblies 52, 54 and 56 may be simultaneously closed and opened at will.

Referring again to FIG. 5 the slide member 30 includes a projection 74 which is connected to a pressure fluid linear actuator 76. The releasable clamp 58 also includes a projection 78 which is connected to another pressure fluid linear actuator 80. The operation of the stripper unit is generally as follows. A predetermined length of wire is fed through the stripper 20 by energizing the stepping motor 34 with a pulse type electrical signal to cause the motor to rotate a predetermined amount which corresponds to a predetermined equivalent linear translation of the periphery of the feed wheel 38 and 40 which are always engaged with the wire 44. When the desired length of wire has been fed past the blade assembly 52 the releasable clamps 48 and 58 are actuated to clamp the wire 44. The actuators 72 are also energized to close the blade assemblies 52, 54 and 56 cutting the wire and cutting the insulation at a predetermined point on either side of the wire cut. With the blade assemblies closed the actuators 76 and 80 are energized to respectively move the slide member 30 and releasable clamp 48 to the left, viewing FIG. 5, and the releasable clamp 58 to the right. This motion operates to strip the insulation from the trailing end of the wire portion that has been fed past the blade assembly 52 and to strip the insulation from the leading end of the wire portion which is still uncut from the bulk reel 24. After the actuators 76 and 80 have moved to perform the insulation stripping operation, the clamps 48 and 58 are released and the actuators 76 and 80 are energized to move in the opposite direction back to the positions shown inn FIG. 5. The uncut wire portion, positively gripped by the feed wheels 38 and 40, moves with the slide member 30 back to the position of FIG. 5 ready for a succeeding cycle of feeding and cutting. The wire that has been cut and now had insulation stripped from both ends has been fed into wire carrier means on the apparatus 10 which will now be described in detail.

WIRE CARRIER AND INDEXING DEVICE

Figure 4:
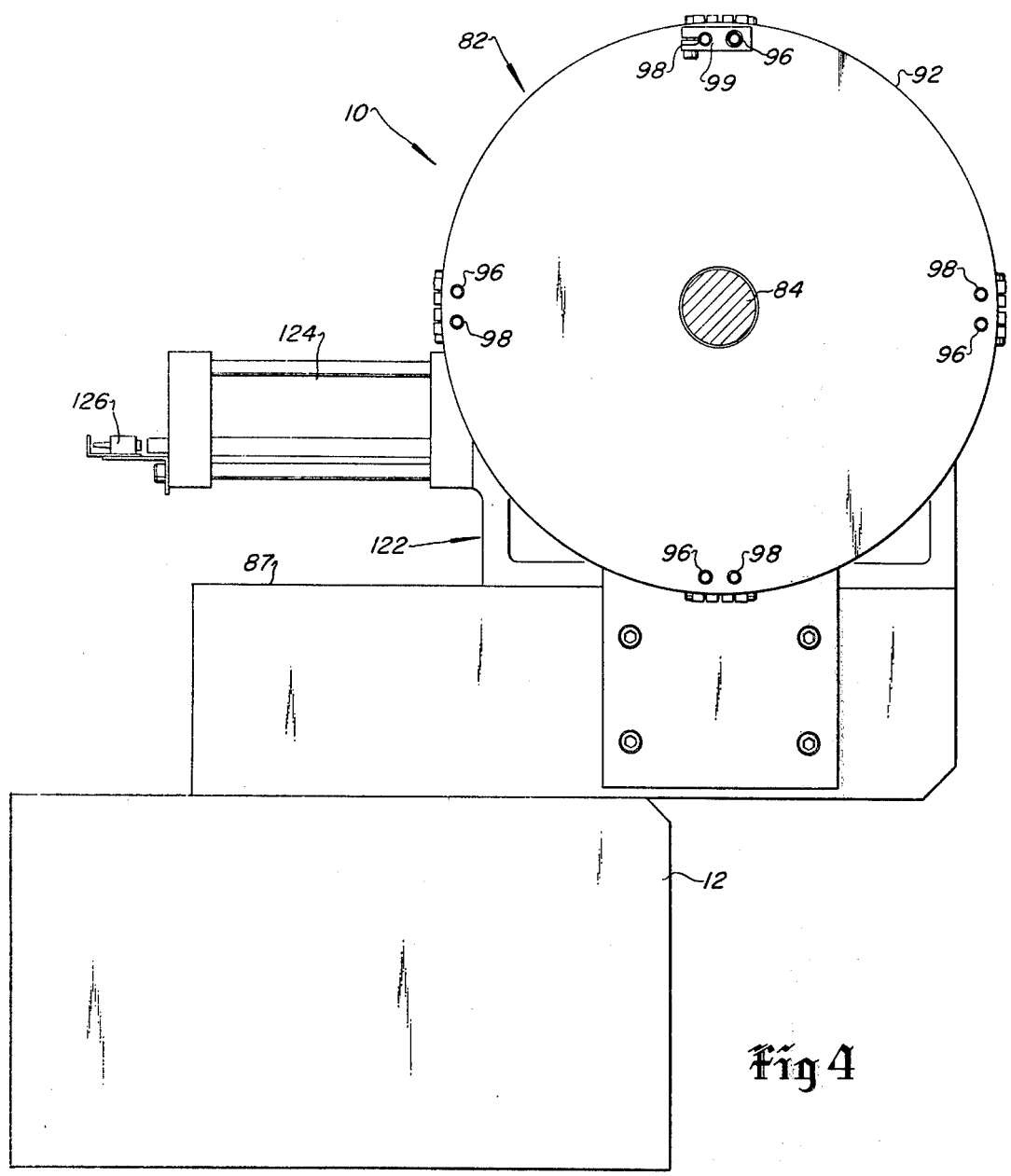
FIG. 4 is a transverse elevation taken along the line 4—4 of FIG. 1.

Referring to FIGS. 1, 3 and 4 the apparatus 10 includes wire carrier means generally designated by the numeral 82. The wire carrier 82 includes an elongated shaft 84 rotatably supported at one end in a bearing support 86, which is mounted on a member 87, and at the opposite end in a support member 88 attached to the wire stripper 20, see FIGS. 3 and 12. The wire carrier 82 further includes circular plates 90, 92 and 94 spaced along and attached to the shaft 84. The plates 90, 92, and 94 comprise support members for four pairs of elongated tubes 96 and 98. Each tube 96 is mounted closely adjacent and parallel to a tube 98 to form the pairs. The tubes 96 and 98 comprise means for receiving and supporting pairs of conductor wires cut to predetermined lengths. The tubes 96 and 98 pass through suitable openings in the support plates and each pair of tubes is spaced at ninety degree intervals around the periphery of the plates. A bracket 99, one shown in FIG. 4, is clamped to each tube 96 and 98 and the opposite tube of each pair passes through a suitable opening in the bracket. The brackets 99 prevent rotation of the tubes 96 and 98. The tubes are longitudinally movable with respect to the plates for a purpose to be explained herein.

Referring to FIGS. 7 and 8, the ends of the tubes 96 and 98 adjacent the plate 90 are each fitted with a releasable wire retaining clamp 100. The retaining clamps 100 each comprise a member 102 fastened to the tube and including an opening 104 aligned with the end of the tube. The member 102 includes a transverse bore 106 in which a plunger 108 is disposed and biased by a spring 110 to clamp a wire 112 as shown in FIG. 7. The plunger 108 includes an opening forming a wire clamping surface 114. The plunger 108 also includes a head portion 116 which is engageable to move the plunger to release the clamping force on the wire 112 and to permit insertion or removal of a wire with respect to the tube 96. The plunger 108 also includes a stem 118 projecting from the member 102.

Figure 9:
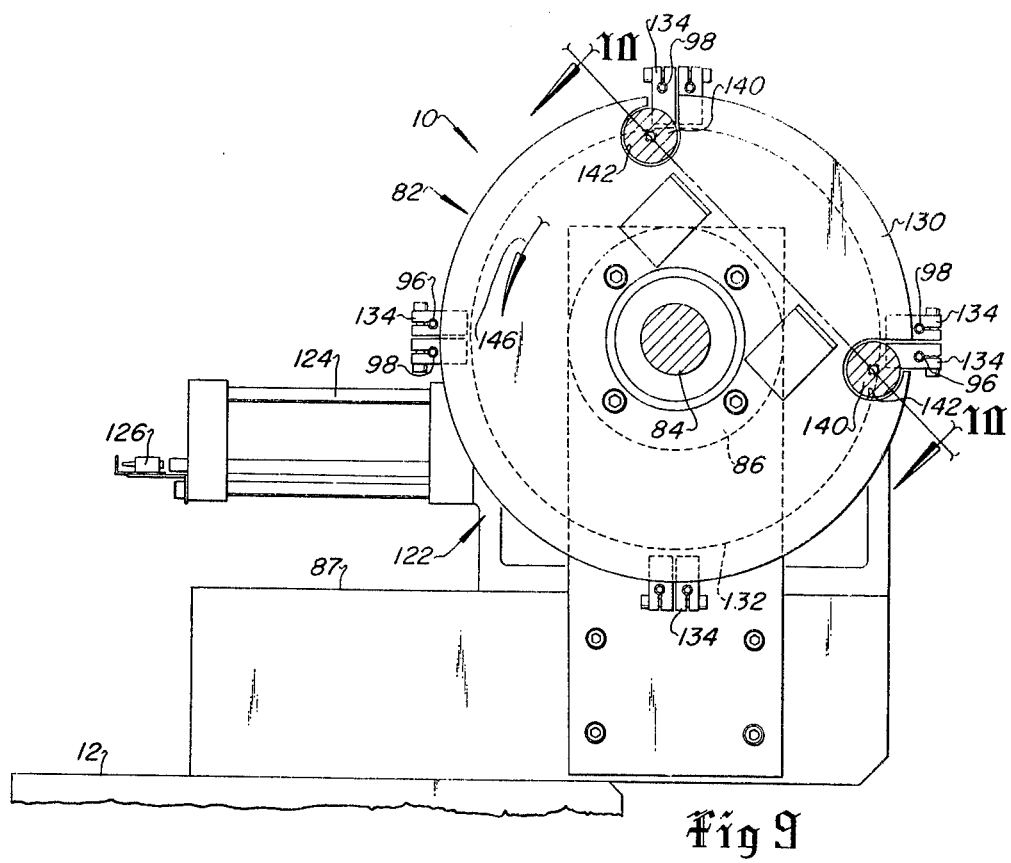
FIG. 9 is a section view taken along the line 9—9 of FIG. 1 showing the wire carrier tube extending mechanism.
Figure 10:
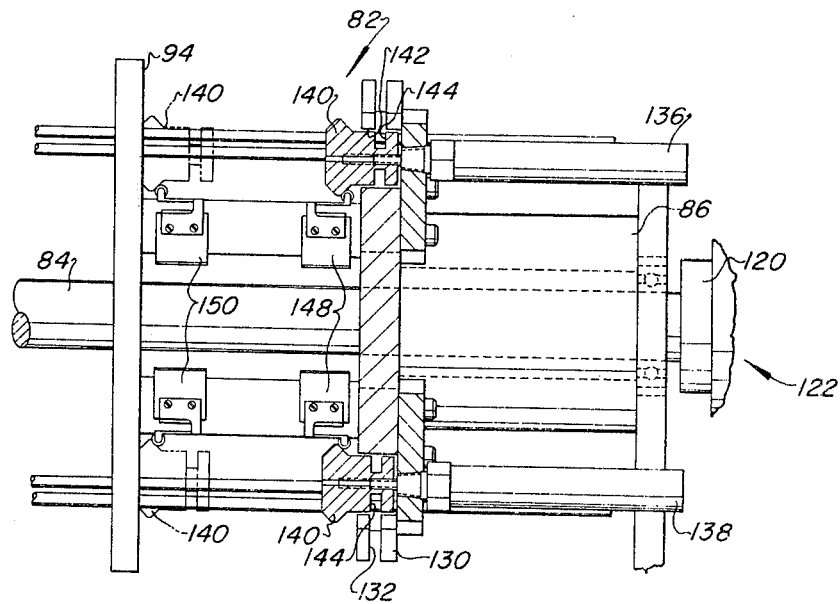
FIG. 10 is a section view taken along the line 10—10 of FIG. 9.

Referring to FIGS. 1 and 10 the wire carrier shaft 84 extends through the bearing support 86 and is drivably connected to the shaft 120 of a fluid operated rotary indexing device 122. The indexing device 122 is a generally well known type, similar to a device disclosed in U.S. Pat. No. 3,103,735, and characterized by a pressure fluid piston and cylinder 124, FIG. 9, wherein a piston rod is connected to a gear rack, not shown, which in turn is engaged with a gear for converting linear motion to rotary motion. Suitable mechanism is provided for positively limiting the rotary motion for each operating cycle of the cylinder actuator. The indexing device 122 is disposed to rotate or index the shaft 84 and wire carrier 82 ninety degrees each time the cylinder 124 is energized. Although other types of indexing devices may be used in place of the indexing device 122, a suitable device, commercially available, is a model 725 indexing table manufactured by the Allenair Corp., Mineola, New York, U.S.A.

The indexing device 122 includes limit switches 126, FIG. 9, and 128, FIG. 1, which are actuated by suitable mechanism to indicate, respectively, that the device 122 is ready to perform an indexing operation and that an indexing operation has been completed.

As previously mentioned, the tubes 96 and 98 are longitudinally movable with respect to the shaft 84 and plates 90, 92 and 94. The purpose of moving the tubes is to place the end of each tube having the wire retaining clamp 100 closely adjacent the releasable clamps 58 of the wire strippers 18 and 20 so that a predetermined length of wire may be fed from each stripper into a tube. An extended position of a tube 96 for receiving a wire from the wire stripper 20 is shown by the dashed lines in FIG. 12. Referring to FIGS. 9 and 10 the bearing support 86 has fastened thereto a circular plate 130 having a circumferential groove 132. Each of the tubes 96 and 98 includes a rectangular block 134 fastened thereto and disposed partly in the groove 132. Mounted on the plate 130, approximately ninety degrees apart, are pressure fluid cylinder and piston type actuators 136 and 138 each having a head 140 attached to the end of a piston rod. The heads 140 are movable through openings 142 in the plate 130 and have circumferential grooves 144 formed to be aligned with the groove 132 in the plate 130 as shown in FIG. 10. Each time the wire carrier 82 is indexed by the indexing device 122 a block 134 of tubes 96 and 98 of two adjacent pairs of tubes are aligned with the openings 142 and are disposed in the groove 144 of the heads 140 of the respective actuators 138 and 136. Referring to the direction of rotation of the wire carrier 82 indicated by the arrow 146 in FIG. 9 the tube 96 of one pair of tubes is in position to be extended by the actuator 138 and is also aligned with the opening 57 in the releasable clamp 58 of the wire stripper 20. The tube 98 of the preceding adjacent pair of tubes is in position to be extended by actuator 136 and is aligned with the releasable clamp 58 of the wire stripper 18. Accordingly, when the actuators 138 and 136 are energized to extend the heads 140 to the position shown by the dashed lines in FIG. 10 tubes 96 and 98 of adjacent pairs are extended to receive a wire fed by the wire strippers 20 and 18, respectively. The heads 140 are each engageable with limit switches 148 when in the retracted position shown in FIG. 10, and when they move from the retracted to the extended position switches 150 are engaged to close. The pairs of switches 148 and 150 are part of a control circuit for the apparatus 10 to be explained further herein. When the actuators 138 and 136 extend the tubes 96 and 98 to receive a wire from the wire strippers 20 and 18 they are deenergized to allow for some retraction movement of the tubes when the releasable clamps 58 on the wire strippers are moved to strip the insulation from the trailing end of the wires being loaded into the tubes. The actuators are later energized to retract the tubes to the indexing position.

When the tubes 96 and 98 are extended into position for receiving wires from the wire strippers the respective wire retaining clamps 100 must be opened to provide for insertion of wires into the tubes. Referring to FIG. 3 the frame 26 of the wire stripper 20 has attached thereto a bracket 152. Mounted on the bracket 152 is a pressure fluid cylinder 154 having a piston rod 156 with a member 158 attached to its distal end. The member 158 is also engaged with a guide bar 160 attached to the bracket 152. When a tube 96 is extended to receive a wire from the releasable clamp 58 of the wire stripper 20 the plunger 108 of a wire retaining clamp 100 is in position to be engaged by the member 158. Prior to feeding a wire into tube 96 the actuator 154 is energized to move the plunger 108 to open the clamp. When a wire is received in the tube 96 and properly prepared by the wire stripper 20 the actuator 154 is deenergized and becomes operable to retract the member 158 so that the clamp 100 retains a wire within the tube. A similar actuator 162, having a piston rod 164, is mounted on the wire stripper 18 and is controlled to open a wire retaining clamp 100 of a tube 98 when the latter is extended to receive a wire. A wire detector switch 163 mounted on the stripper 18 is disposed to be actuated by the end portion of a wire projecting from a tube 96 when the wire carrier 82 is indexed. Similarly a switch 165 mounted on a support 194 is positioned to be actuated by a wire disposed in a tube 98.

WIRE OFFSET ACTUATOR

The apparatus 10 further includes means for longitudinally offsetting the end of one wire of a pair with respect to the other wire prior to the twisting operation. Since the wire strippers 18 and 20 may be controlled to provide wires of different lengths a pair of twisted wires may be prepared which are longitudinally offset at one end without performing an offsetting operation. However, in many applications of twisted pairs of conductor wires equal wire lengths with equal amounts of longitudinal offset are required as well as unequal wire lengths with unequal amounts of offset. FIG. 2 shows a typical application of a pair of twisted conductor wires 166 connected to spaced apart terminals 168 on a terminal board 170. Although it is desirable to maintain the wires twisted throughout as much of their length as possible the required terminal connection pattern and wire routing makes necessary the greater length of wire 172 beyond the final twist. Hence the ends of the wires of the pair 166 are longitudinally displaced or offset one from the other a desired amount prior to twisting.

Figure 11:
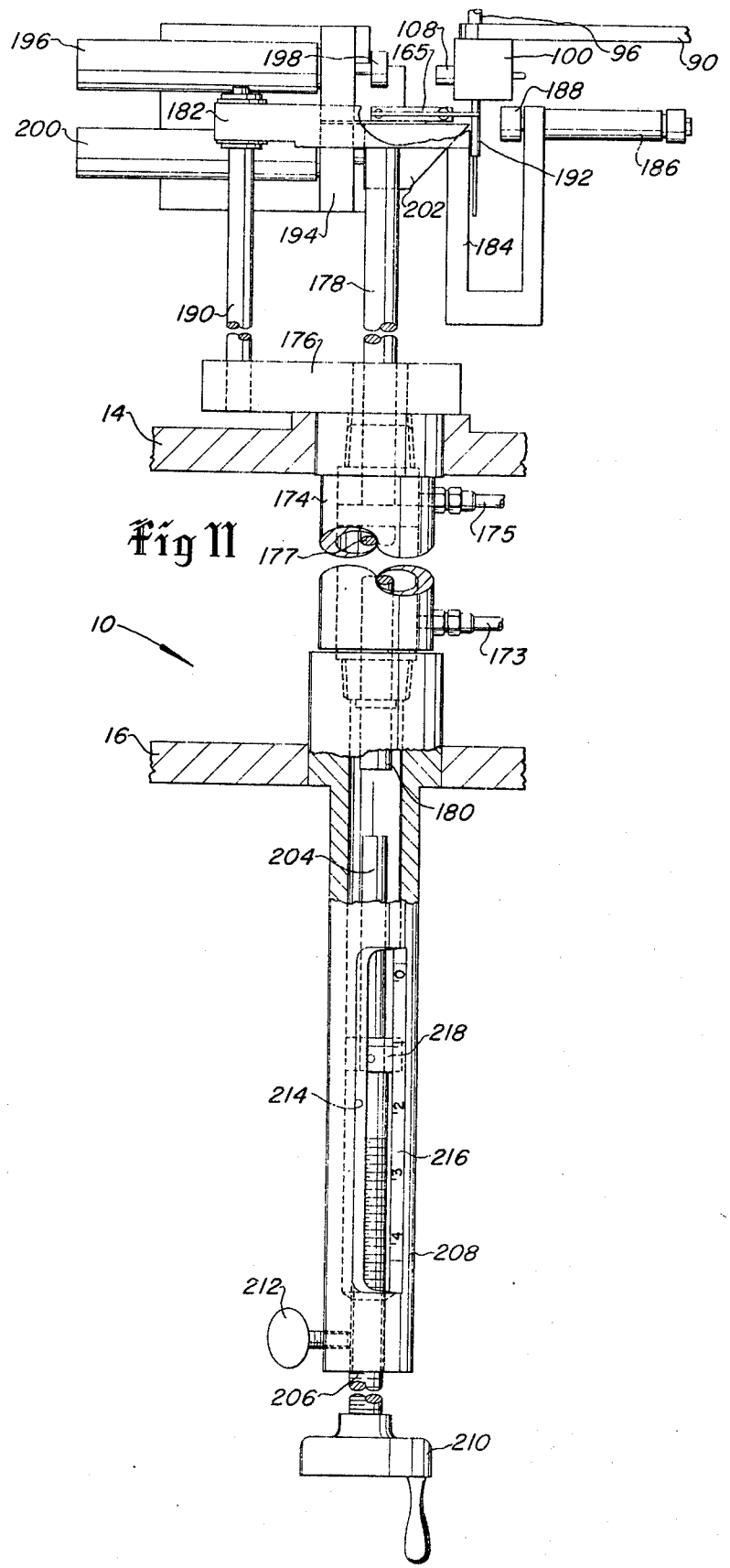
FIG. 11 is a plan view of the wire offsetting actuator taken along the line 11—11 of FIG. 3.

Referring to FIGS. 3 and 11 the offsetting means is characterized by a reversible fluid operated cylinder and piston actuator 174 mounted on the support 16 and in a housing 176 which in turn is mounted on the support 14. The actuator 174 includes fluid inlet conduits 173 and 175 which are connected to a suitable valve, not shown, to provide reversible movement of a piston rod 177. The piston rod 177 has a portion 178 extending from one end of the actuator 174 and a portion 180 extending from the opposite end. Attached to the distal end of the rod portion 178 is a bracket 182 having a U-shaped portion 184. A small fluid operated actuator 186 is mounted on the bracket portion 184 and includes a movable clamping jaw 188 attached to its piston rod. The bracket 182 is slidably supported on a guide bar 190 suitably mounted on the support 176. As shown in FIGS. 3 and 11 the cylinder actuator 174 is positioned on the apparatus 10 such that when the wire carrier means 82 is indexed to receive wires in tubes 96 and 98 of adjacent pairs of tubes a tube 96 of a pair is located so that a wire 192 disposed within the tube will have its end in a position to be clamped between the jaw 188 and the and the bracket portion 184. Mounted adjacent to the bracket 184 and on the support 194 is a fluid operated actuator 196 having a piston rod 198 engageable with the plunger 108 of a wire retaining clamp 100 to open the clamp so that a wire may be partially withdrawn from a tube 96 during the offset operation. Also mounted on the support 194 is a fluid operated linear actuator 200 having a knifelike guide plate 202 attached to its piston rod. When a wire in a tube 96 is clamped for the offsetting operation the actuator 200 is also energized to position the guide plate 202 between the tubes 96 and 98 to positively separate the wires extending from the retaining clamps 100 and prevent accidental clamping and offset of the wire in a tube 98.

The amount of longitudinal offset of the wire in a tube 96 is controlled by means comprising a movable abutment 204 engageable with the end of the piston rod portion 180. The abutment 204 comprises an elongated rod having a threaded portion 206 engaged with threads formed in a housing 208. A suitable crank 210 is connected to one end of the rod 204 and a lockscrew 212 is disposed on the housing 208 and engageable with the rod. An elongated opening 214 in the housing 208 is provided with suitable indicia 216 for indicating the amount of offset by aligning a collar 218 fixed on the rod 204 with the desired numbered setting. Accordingly, a predetermined amount of longitudinal offset including no offset movement may be provided for a wire in a tube 96 by positioning the end of the abutment rod 204 to be engaged by the piston rod portion 180 when the actuator 174 is energized to move downwardly, viewing FIG. 11.

WIRE TENSIONING DEVICE

The apparatus 10 also includes means for withdrawing a pair of wires which are located in tubes 96 and 98 of a pair of tubes and twisting one wire about the other to form a twisted configuration generally like that shown by the example of the twisted pair 166 of FIG. 2. After the wire carrier means 82 has been rotatably indexed to place a pair of tubes 96 and 98 adjacent the offsetting actuator 174 the indexing device 122 is further actuated to index the wire carrier to place a pair of wires in wire tensioning means characterized by a device shown in FIGS. 12 through 16 and generally designated by the numeral 220. The wire tensioning device 220 includes a housing 222 mounted on a bracket 223 which in turn is adjustably fastened to the base 12. The housing 222 includes a recess 224 in which is disposed a movable wire guide plate 226. The wire guide plate is characterized by sloping surfaces 228 and 230 which converge to a vertical slot 232 as shown in FIGS. 13 and 15. The guide plate 226 is retained in the recess 224 by a cover plate 234 shown removed in FIG. 13. The housing 222 also includes a bore 236 in which is disposed a cylindrical pin 238 having a conical end portion 240. The end of the pin 238 opposite the conical portion 240 is connected to a member 242 which in turn is connected to the end of a piston rod 244 of a pressure fluid cylinder actuator 246. The actuator 246 is mounted on a downwardly projecting portion 248 of the housing 222. The pin 238 and guide plate 236 are connected to move together by a pin 250 movable in a slot 252 in the housing 222 as shown in FIG. 13.

The housing 222 includes a tranverse slot 254 having a somewhat V-shaped opening 256 to the side of the housing. The slot 254 is operable to receive the end portions of a pair of wires 258 and 260 extending from the wire retaining clamps 100 as a pair of tubes 96 and 98 are indexed into a position ninety degrees displaced from the wire offsetting actuator 174. As shown in FIG. 15 the cover plate 234 includes an opening formed partly by the sloping surface 255 which intersects a transverse slot 257. The slot 257 is slightly smaller in width than the slot 254. When a pair of wires 258 and 260 are in the position shown by the dashed lines in FIG. 15 the actuator 246 is energized to move the pin 238 and guide plate 226 from a downward or retracted position, not shown, to the position shown in FIG. 13. As the pin 238 and plate 226 are moved upwardly, viewing FIGS. 13 and 15, and pin 238 moves between the wires 258 and 260 while the wire 260 is engaged by the surface 228 and wire 258 is engaged by surface 230 on the guide plate. The resultant action is movement of wire 258 into the slot 232 in a position over the wire 260 as shown in FIG. 15 and bending of the wires partially around the pin 238 as shown in FIG. 14. The slot 232 in the guide plate 226 is formed to have radii 262, FIG. 16, between the sides of the slot and the inner face 264. The size of the radii 262 as well as the width of the slot 232 and the position of the plate 226 with respect to the pin 238 have been determined to have an effect on the magnitude of the force which resists movement of the wires 258 and 260 around the pin and through the slot 232 as they are longitudinally withdrawn from the tubes 96 and 98.

It has been determined that different wire diameters and types of insulation require different magnitudes of frictional drag on the wires as they are pulled through the tensioning device 220. Accordingly, the size and shape of the radii 262 may be changed to provide the desired amount of force required to pull the wires through the device. Moreover, the diameter of the pin 238 and the position of plate 226 with respect to the pin may also be varied to control the tension in the wires as they are withdrawn.

Figure 12:
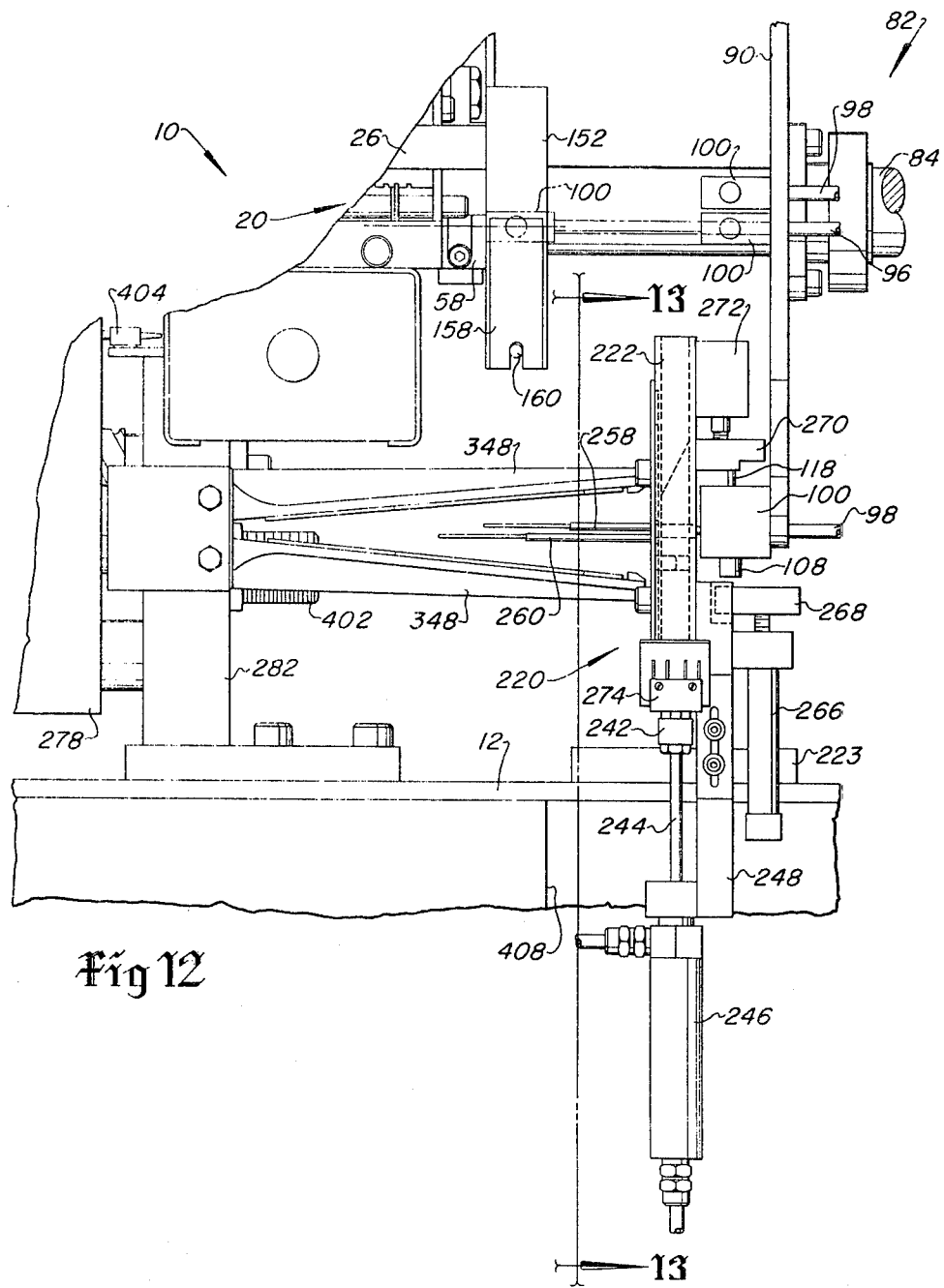
FIG. 12 is a fragmentary elevation taken, in the same direction as FIG. 1 showing the wire tensioning device and a portion of the wire twisting and pulling apparatus.

As shown in FIG. 12 the tensioning device 220 includes a fluid operated cylinder tape actuator 266 having a member 268 which engages the plungers 108 to open the wire retaining clamps 100 to allow wires to be pulled from a pair of tubes 96 and 98. The stems 118, one shown, of the retaining clamp plungers 108 engage an actuating member 270 of an electrical switch 272 to hold the switch open as long as a wire is disposed in either tube of a pair of tubes 96 and 98. The wire tensioning device 220 also includes an electrical switch 174 positioned to be actuated by the member 242 when the actuator 246 moves the plate 226 and pin 238 to the position shown in FIG. 13.

WIRE TWISTING APPARATUS

Figure 17:
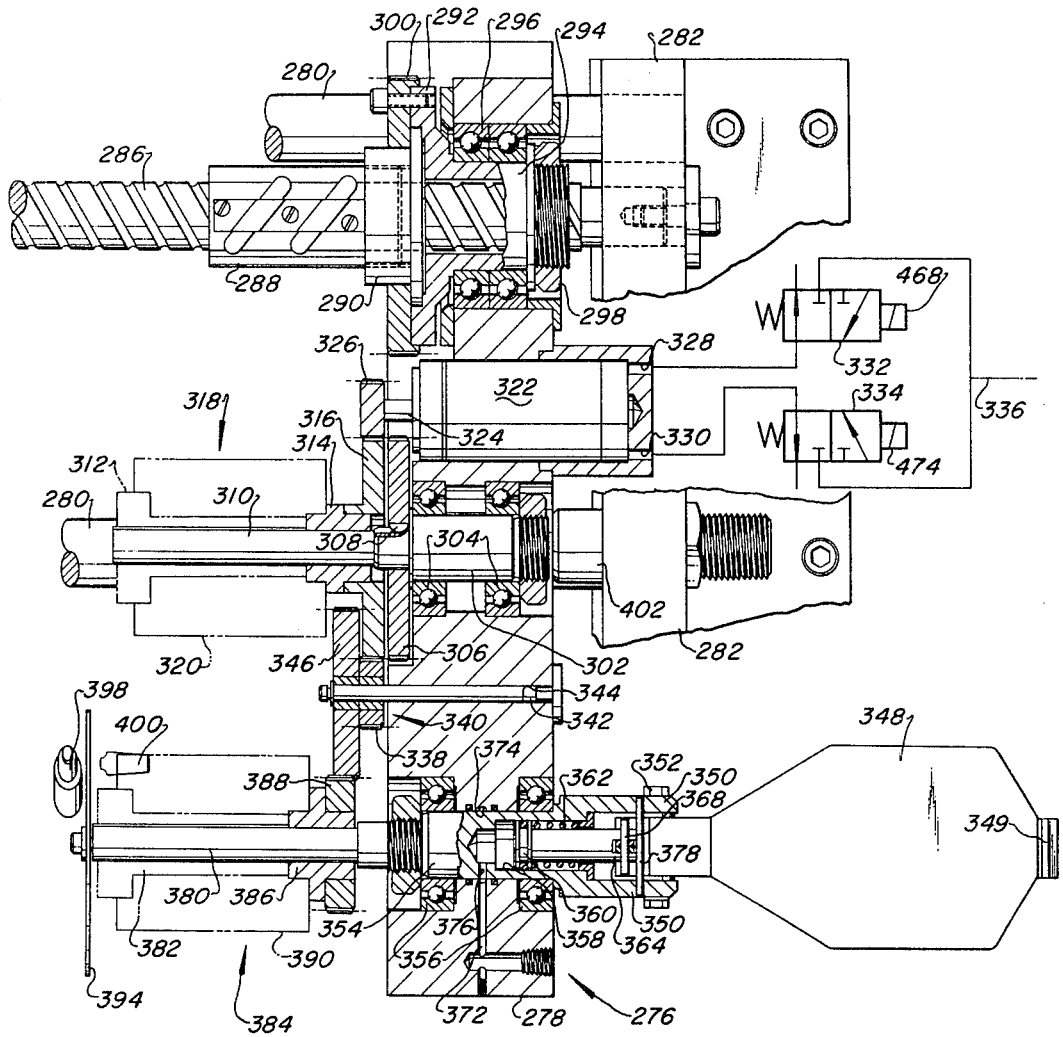
FIG. 17 is an offset section view taken substantially along the line 17—17 of FIG. 18 to show how the components of the wire twisting apparatus are interengaged.
Figure 18:
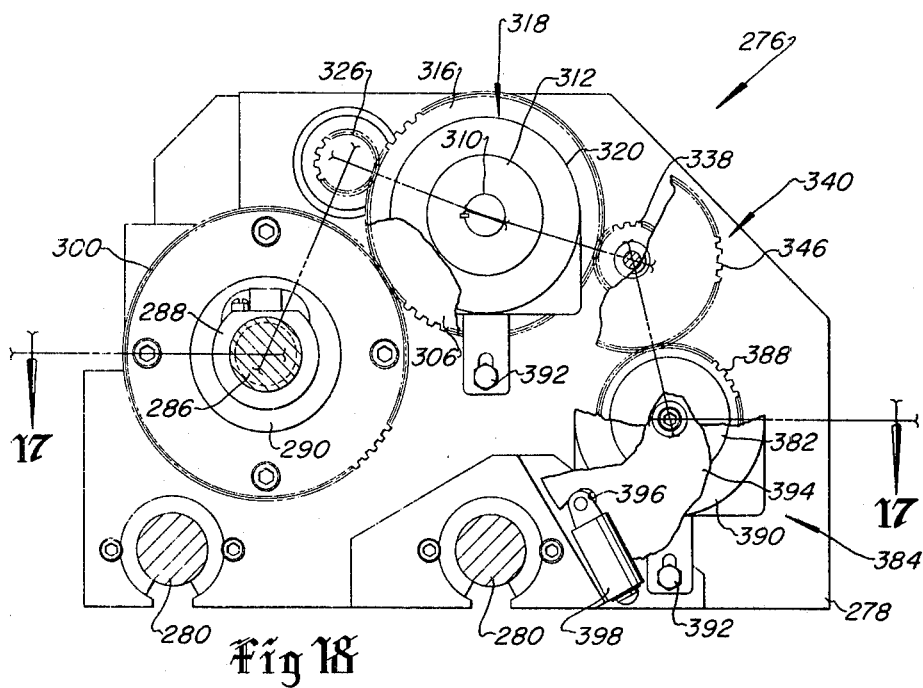
FIG. 18 is an end view of the wire twisting apparatus taken from the line 18—18 of FIG. 1.

Referring to FIGS. 1, 17 and 18 the apparatus 10 is further characterized by a movable apparatus, generally designated by the numeral 276, comprising means for twisting a pair of wires together while withdrawing the wires from the wire carrier 82 and through the wire tensioning device 220. The wire twisting apparatus 276 includes a carriage 278 which is slidably mounted on two cylindrical rods 280 which are mounted on supports 282 and 284 on the base 12 and substantially parallel to the shaft 84. An elongated screw 286 having a helical groove formed thereon is also mounted between the supports 282 and 284 and is nonrotatably secured to the supports. The screw 286 is part of a well known type of actuator commonly known as a ball bearing screw. Referring to FIGS. 17 and 18 the screw 286 cooperates with a nut 288 which contains a plurality of ball bearings which circulate in a closed pathway between the helical groove on the screw 286 and the nut. The ball bearing screw and nut is a well known device for converting rotary motion to linear motion. The nut 288 and screw 286 comprise drive means for linearly moving the carriage 278 toward and away from the wire carrier 82. The nut 288 is mounted on a cylindrical hub 290 which is supported in a flanged portion 292 of a hollow shaft 294. The shaft 294 is rotatably mounted in suitable bearings 296 disposed in the carriage 278 and is secured in the bearings by a nut 298. The hub 290 is clamped between the flanged portion 292 and a gear 300 mounted on the exterior of the hub. The hub 290, ball bearing nut 288, gear 300, and shaft 294 are operable to rotate together.

The carriage 278 also includes a rotatable shaft 302 mounted in bearings 304, disposed in the carriage. The shaft 302 includes a gear 306 which is secured to the shaft by a key 308. The shaft 302 further includes a portion 310 which is fitted in and keyed to a hub 312. A second hub 314 having a gear 316 mounted thereon is also fitted over the shaft 310 but is operable to rotate relative to the shaft. The hubs 312 and 314 are part of a device known as an elecromagnetic combination clutch and brake, generally designated by numeral 318. The clutch 318 is of a type generally well known and is characterized by a housing 320 containing suitable electromagnetic windings or coils which can be selectively energized and deenergized by suitable controls, not shown. The clutch 318 is of a type which can be energized to cause the hubs 312 and 314 to rotate together, and, accordingly, rotate with the shaft 302, or the hub 312 and shaft 302 can be selectively braked to stop rotating while the hub 314 is permitted to rotate with respect to the shaft 302. The above type of combination clutch and brake is commercially available and a suitable device is a model UCB-26C combination clutch and brake manufactured by the Electroid Corporation, Union, New Jersey, U.S.A. For purposes of the following description it will be assumed that when the clutch is engaged the hubs are operable to rotate together and when the clutch is disengaged the hub 312 is braked and the hub 314 is rotatable on the shaft portion 310.

The carriage 278 further includes a pneumatic rotary motor 322 having a rotary shaft 324 which includes a pinion gear 326 integrally formed thereon. The motor 322 may suitably be of the well known rotary vane type and is provided with ports 328 and 330 which can operate as either exhaust or inlet ports to provide for reversible operation the motor. The ports 328 and 330 are respectively connected to solenoid operated valves 332 and 334 which are also connected to a source of pressure air, not shown, by a conduit 336. The valves 332 and 334 are operable to be selectively energized to provide for reversible operation of the motor 322 as will be discussed in greater detail herein. As shown in FIGS. 17 and 18 the pinion 326 is engaged with the gear 316. Referring to FIG. 18, the gear 306 mounted on shaft 302 is constantly engaged with gear 300. The gears 300 and 302 are not shown engaged in FIG. 17 because the plane of the section view does not pass directly between the centerlines of the gears 300 and 306.

The gear 316 is also engaged with a gear 338 of a pair of gears 340 rotatably mounted side by side on a shaft 342 which is removably mounted in a bore 344 in the carriage 278. The gear 338 is suitably fastened to a gear 346 to provide the pair of gears 340 which rotate together. The shaft 342 may be moved from the bore 344 to one of a number of alternate parallel bores, not shown, which are in proximity to the bore 344, and the pair of gears 340 may be interchanged with other pairs of gears of different diameters and numbers of teeth for a purpose to be explained herein.

The carriage 278 includes means for gripping and rotatably twisting a pair of wires such as the wires 258 and 260, FIG. 12. The wire twisting means comprises pivoted jaws 348 including resilient gripping pads 349 disposed on each jaw. The jaws 348 are operable to be open to receive a pair of wires as shown in FIG. 12 and to be closed to the position shown in FIG. 19 to clamp a wire pair between the pads 349. The jaws 348 are each pivotally supported between spaced apart arms 350 by pivot pins 352. The arms 350 are integrally formed as a portion of a rotatable shaft 354 supported in bearings 356 in the carriage 278. The shaft 354 includes a longitudinal bore 358 in which is disposed a piston 360. The piston is biased to the left, viewing FIG. 17, by a spring 362 which is retained in the bore 358. Referring to FIG. 19 also, the piston 360 has an integral rod portion formed as a clevis 364 at its distal end. Two members 366 of like configuration are pivotally connected to the clevis 364 by a pin 368. The opposite ends of the members 366 are pivotally connected to portions 370 of the jaws 348. Pressure fluid is admitted to an vented from the bore 358 through a passage 372 which is in communication with a circumferential groove 374 in the carriage 278 and a passage 376 in the shaft 354. In response to admission of fluid to the bore 358 the piston 360 and connecting members 366 are actuated to pivot the jaws 348 to the closed position shown in FIG. 19. A pin 378 limits the movement of the clevis 364, as shown in FIG. 19, to close the jaws. When pressure fluid is vented from the bore 358 the spring 362 operates to move the piston 360 to open the jaws to the position shown in FIG. 12.

The rotatable shaft 354 also includes a portion 380 extending in the opposite direction from the end connected to the jaws 348. The shaft portion 380 is keyed to a hub 382 of a combination electric clutch and brake 384 which also includes a hub 386 mounted on the shaft 380 and rotatable with respect to the shaft. A gear 388 is mounted on the hub 386 for rotation with the hub 386. The combination clutch and brake 384 is of the same type as the clutch 318, that is, when the clutch is engaged the hubs 382 and 386 are caused to rotate together to transmit torque from the gear 388 to the shaft 354. When the clutch 384 is disengaged the hub 382 and shaft 354 are braked to stop rotating while the hub 386 is permitted to rotate with respect to the shaft 354 and the clutch housing 390. The housings 320 and 390 of the respective clutches 318 and 384 are secured to the carriage 278, as shown in FIG. 18, by pins 392 to prevent rotation of the housings with respect to the carriage. The gear 388 is engaged with the gear 346 of the pair of gears 340 whereby the shaft 354 may be rotatively driven by the motor 322, depending on the operating condition of the clutch 384. The distal end of the shaft portion 380 includes a circular disk 394 fastened thereto. As shown in FIG. 18 the disk 394 has a notch 396 formed on its periphery. A light source 398 is mounted near the periphery and on one side of the disk 394 and a photoelectric or light responsive sensor 400 is mounted on the opposite side of the disk near the light source 398. As the notch 396 passes the light source 398, with each revolution of the shaft 354 and disk 394, the sensor 400 is operable to transmit an electrical signal to a control system for a purpose to be explained further herein.

From the foregoing description of the wire twisting and pulling apparatus 276, it may be understood that the shaft 354 and the ball nut 288 may be rotatably driven by the motor 322 simultaneously or independently depending on the operating condition of the clutches 318 and 384. If clutches 318 and 384 are both engaged the motor 322 when energized will rotate the ball nut 288 which will result in linear translation of the carriage 278 along the rods 380. The shaft 354 and twisting jaws 348 will also be rotatively driven by the motor 322. If the clutch 318 only is disengaged to stop the shaft 302, the motor 322 may be operated to rotate the twisting jaws 348 without linear movement of the carriage 278. Moreover, if the clutch 318 is engaged and clutch 384 is disengaged the carriage 278 may be moved along the rods 280 without rotation of the twisting jaws 348. It may be appreciated from the foregoing that the structural arrangement of the twisting apparatus 276 provides a definite relationship between the linear distance the carriage 278 moves along the rods 380 for a certain number of revolutions of the twisting jaws 348. This relationship is dependent on the diameters and number of teeth of the gears 338 and 346 of the pair of gears 340. Accordingly, the pair of gears 340 may be interchanged with other pairs of gears having different diameters and number of teeth whereby the number of revolutions of the twisting jaws 348 for a certain amount of linear movement of the carriage 278 may be altered. In this way the number of twists imposed on a pair of wires per unit length of wire may be changed in accordance with predetermined requirements for certain wire sizes and for certain applications of twisted wire pairs.

Prior to the commencement of an operating cycle of the twisting and pulling apparatus 276 the motor 322 is operated to move the carriage 278 to the position shown in FIG. 12 wherein the carriage engages an adjustable abutment 402, FIG. 17, mounted on the support 282. The location of gripping the end portions of a wire pair by the pads 349 on the jaws 348 may be predetermined by adjusting the abutment 402 to position the carriage 278. The wire twisting jaws 348 are controlled to be in the open position and in the rotative position shown in FIG. 12 for receiving the end portions of the wires 258 and 260 projecting from the tensioning device 220. An electrical switch 404 on the support 282 is actuated by the carriage 278 when the carriage is in the position shown in FIG. 12. When the wires 258 and 260 are placed in the over and under position shown in FIG. 12 by the tensioning device 220 and the retaining clamps 100 are opened, pressure fluid is supplied to close the jaws 348 to clamp the wires. The clutches 318 and 384 are engaged at this time and the motor 322 is energized to move the carriage 278 away from the support 282 and rotate the jaws 348 to twist the wires together to form a twisted pair similar to the pair 166 shown in FIG. 2. When a predetermined number of twists or revolutions of the jaws 348 has been sensed by the sensor 400 the clutches 318 and 384 are operated to be disengaged to stop the shafts 302 and 354.

It has been determined that twisting a pair of insulated conductor wires together by clamping the wires at one end and withdrawing the wires from a carrier or supporting means can cause a torsional bias to be imposed on the wires which results in violent untwisting and damage to the trailing ends of the wires as they pass out of the tubes 96 and 98 and through the tensioning device 220. Accordingly, when the wire twisting and pulling apparatus 276 has imparted a predetermined number of twists to a pair of wires the clutch 384 only is reengaged and the motor 322 is reversed to rotate the jaws 348 in the opposite direction to the twisting operation for a predetermined number of revolutions. This operation unwinds or relaxes the torsional bias on the wires to prevent the aforementioned violent untwisting.

After the untwisting operation is completed the clutch 384 is disengaged, the clutch 318 is engaged, and the motor 322 is operated to move the carriage 278 away from the support 282 to pull a pair of wires out of the tensioning device 220 without further twisting. When the wires are pulled from the tensioning device the jaws 348 are opened and a completed wire pair is dropped into a bin 408 mounted on the base 12. When the jaws have moved clear of the ends of a wire pair the motor 322 is reversed and the carriage 278 is returned to the position shown in FIG. 12 in preparation for another operating cycle.

OPERATION AND CONTROL SYSTEM

As may be appreciated from the foregoing the apparatus 10 may be operated in a way such that the wire strippers 18 and 20, the offset actuator 174, and the twisting and pulling apparatus 276 may perform their respective functions simultaneously. The wire strippers 20 and 18 operate to supply predetermined lengths of wire to tubes 96 and 98 of a pair of tubes during successive operating cycles of the apparatus. For example at the commencement of an operating cycle assume that the wire carrier 82 has just been rotatably indexed. The pair of tubes 96 and 98 adjacent the stripper 20 are both empty and tube 96 is in position to receive a wire. The pair of tubes positioned adjacent wire stripper 18 have a wire disposed in a tube 96 from the previous operating cycle and a tube 98 is disposed to receive a wire from wire stripper 18. The pair of tubes 96 and 98 adjacent the offset actuator 174 have wires in both tubes and a tube 96 is in position to have a wire offset by the actuator 174. The fourth pair of tubes is in position wherein the end portions of a pair of wires are disposed in the tensioning device 220. The apparatus 10 may now be actuated to have the wire strippers 20 and 18 place wires in their respective adjacent tubes 96 and 98, the offset actuator 174 may be actuated, if desired, and the twisting and pulling apparatus 276 may be energized after the tensioning device 220 is actuated to the position shown in FIGS. 13 and 14. When all operations are completed the indexing device 122 is actuated to index the wire carrier 82 90° of angular rotation and another operating cycle is commenced. Accordingly, a pair of wire receiving tubes 96 and 98 is progressively moved, during three successive operating cycles, from a first position wherein wires are disposed in both tubes of a pair to a second position wherein a pair of wires is disposed in the tensioning device 220 and withdrawn from the tubes to be twisted together. If desired, one wire of a pair can be longitudinally offset when a pair of tubes is in an intermediate position adjacent the offset actuator 174.

Figure 20:
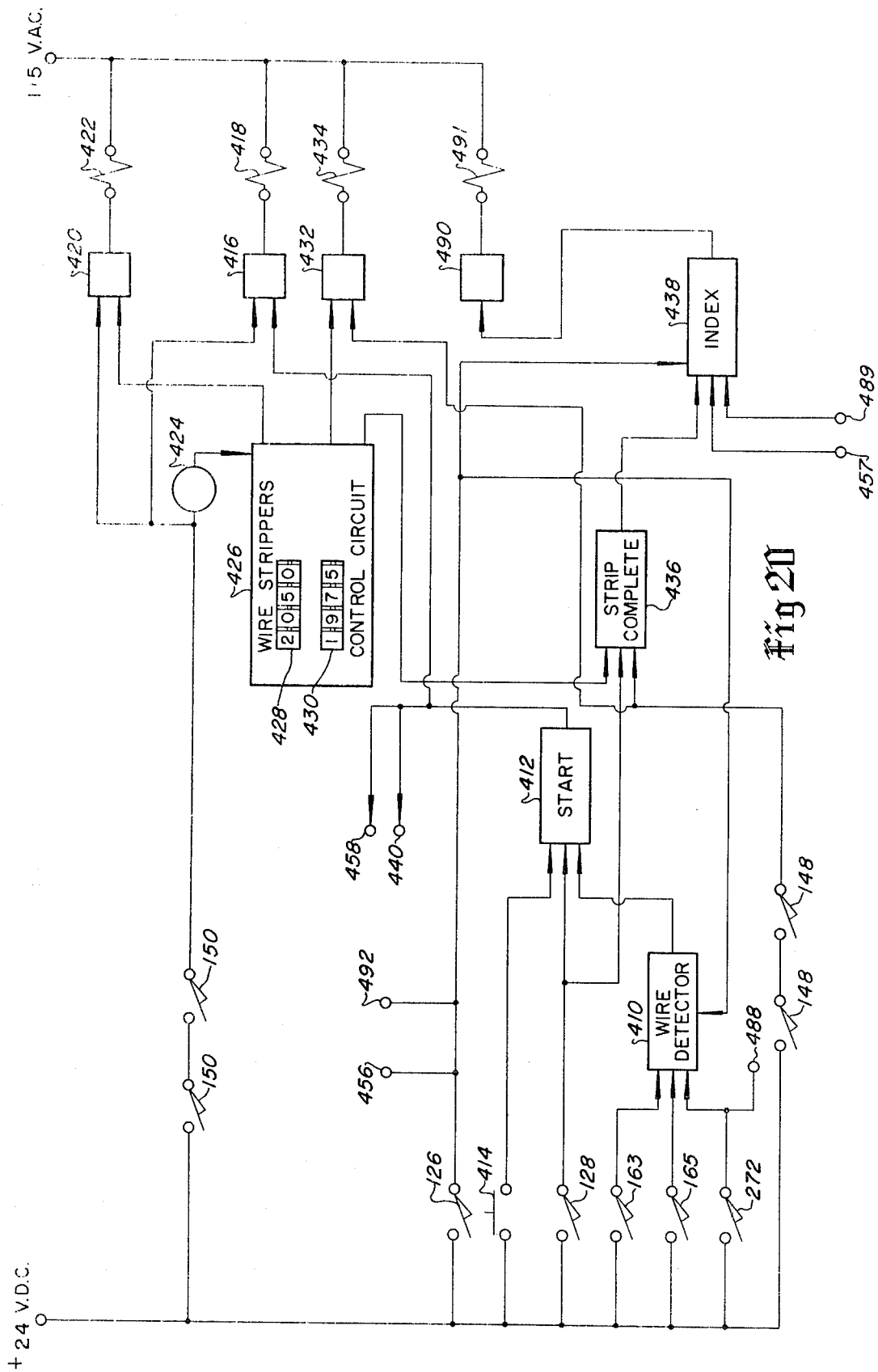
Figure 21:
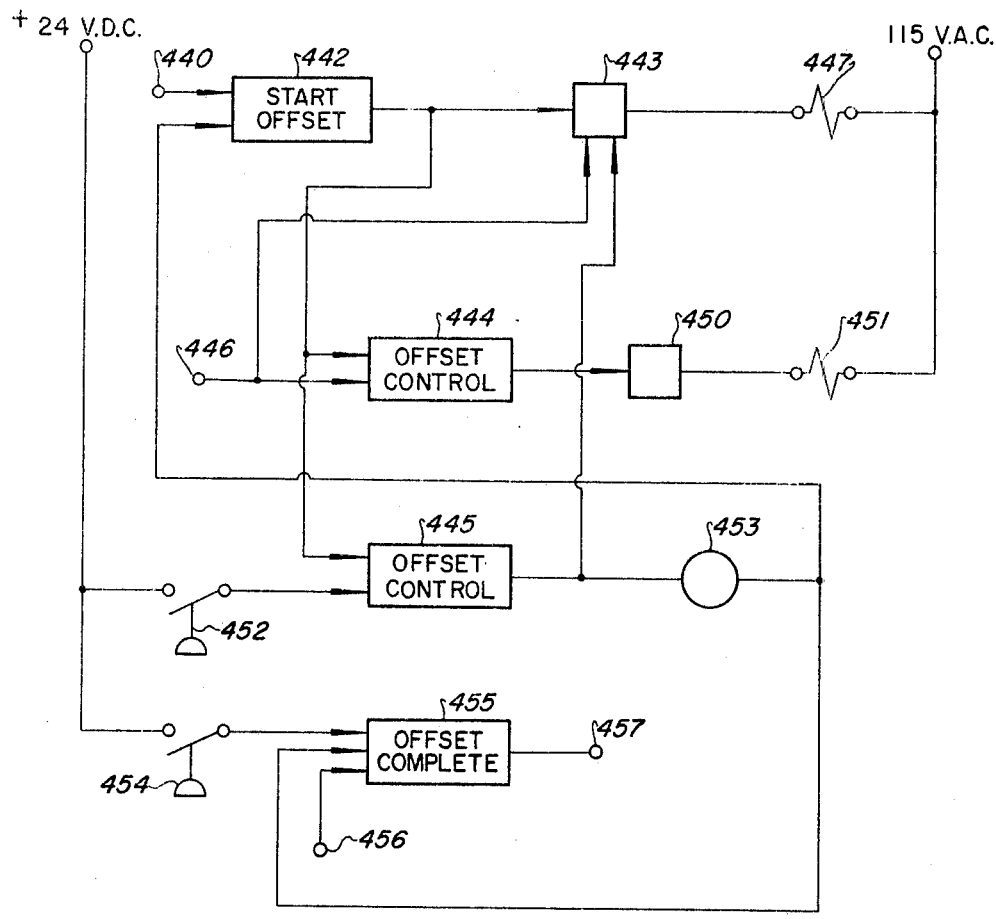

The operation of the apparatus 10 in conjunction with an electrical control system shown schematically in FIGS. 20 through 22 will now be described. The control system shown in FIGS. 20 through 22 is of a type which makes extensive use of what are known in the art of electrical controls as electronic logic circuits. These circuits are described in general only in regard to their function and it is believed that one of ordinary skill in the art of electrical controls for machines will readily be able to determine that a variety of suitable devices commercially available may be used in the circuits described in order to practice the invention. The control circuits shown are designed to use a 24 volt direct current source except for the solenoid valve operators which use a 115 volt alternating current source and the clutches 318 and 384 which are energized by a 12 volt direct current source. Symbols for switches and solenoids are generally in accordance with Joint Industry Conference (JIC) standards. The solenoids shown schematically in FIGS. 20 through 22 are each connected to suitable valves, most of which are not shown, for valving pressure fluid to and from their associated actuators and motors.

Referring to FIG. 20 the control system shown includes a wire detector circuit 410 which is operable to receive a signal from wire detector switches 163 and 165 and from 272 on the tensioning device 220. The switches 163, 165 and 272, when closed, respectively indicate that wires have been loaded in tubes 96 and 98 of a pair of tubes, and that both wires of a pair of wires have been withdrawn from the tensioning device 220 as a result of a previous operating cycle. Input signals from switches 163, 165 and 272 will cause the wire detector circuit 410 to send a signal to a starting circuit 412. The switch 128 on the indexing device 122 will close on completion of an indexing operation to also send a signal to circuit 412. Switch 128 remains closed except for momentary opening when the indexing device 122 commences an index operation. The circuit 412 is also connected to a manually actuated switch 414 which is operable to be closed by the machine attendant. When the circuit 412 has received a signal from switches 128 and 414, and the wire detector circuit 410 a signal is transmitted to a switching circuit 416 referred to as a solenoid drive. Upon receipt of a signal from circuit 412, the solenoid drive 416 energizes a solenoid 418 which results in energization of actuators 136 and 138 to move a tube 98 and a tube 96 longitudinally into position to receive wires from the wire strippers 18 and 20. When the tubes have moved forward into wire receiving position both switches 150 will close to transmit a signal for a solenoid drive 420 to energize a solenoid 422 thereby causing actuators 154 and 162 to operate to open the retaining clamps 100 on the respective tubes 96 and 98 in position to receive wires. The switches 150 are also connected to an electrical time delay 424 which delays transmission of a signal to a control circuit 426 for the wire strippers 18 and 20. The switches 150, when closed, also transmit a signal to solenoid drive 416 causing the solenoid 418 to be deenergized and, accordingly, the actuators 136 and 138 to be deenergized also. However, the tubes 98 and 96 remain in the extended position. The time delay 424 operates to insure the wire retaining clamps 100 on each tube are open before the control circuit 426 commences operation of the strippers 18 and 20.

The control circuit 426 is operable to provide for the operation of the wire strippers 18 and 20 to feed predetermined lengths of wire into tubes 98 and 96 respectively, to cut and strip insulation from the wire ends, and to cut the wires to the predetermined lengths. The control circuit 426 includes suitable devices, commercially available, for transmitting predetermined electrical pulse signals to the feed motors 34 on the strippers 18 and 20 causing the motors to rotate a predetermined number or revolutions or portions thereof to feed predetermined lengths of wire into the tubes 98 and 96. The number of pulse signals imposed on the motors 34 of each stripper 18 and 20 may be preset by suitable switches 428 and 420 respectively to, accordingly, preset the lengths of wire to be cut and stripped. Those skilled in the art of electrical controls will recognize that alternatively the control circuit 426 may be modified to receive predetermined pulse signals from numerical control equipment for automatic operation of the wire strippers to cut and strip various combination of wire lengths.

When the control circuit 426 has completed the operation of wires strippers 18 and 30 to load a predetermined length of wire into the respective tubes 98 and 96 a suitable signal is sent from control circuit 426 to solenoid drive 420 deenergizing solenoid 422 and actuators 54 and 162 to close the wire retaining clamps 100. A suitable signal is also sent from the control circuit 426 to a solenoid drive 432 which energizes solenoid 434 causing its associated valve to energize actuators 136 and 138 to retract the tubes 98 and 96 to the position shown in FIGS. 9 and 10. When the tubes 98 and 96 are retracted the actuator heads 140 close switches 148 which cause the solenoid drive 432 to deenergize solenoid 434 and actuators 136 and 138. Switches 148 are also connected to a circuit 436. The circuit 436 is also operable to receive a signal from the wire stripper control circuit 426 indicating completion of an operating cycle of both wire strippers 18 and 20. When circuit 426 receives a signal from the wire stripper control circuit 426 and a signal through both switches 148, a signal is conducted to an indexing circuit 438 to indicate that a complete operation of feeding predetermined lengths of wire from strippers 18 and 20 has been completed and that the tubes 98 and 96 are retracted and ready for an indexing operation.

Referring to FIG. 21 the control system for the apparatus 10 also includes electrical circuitry for controlling the offset actuator 174. Upon commencement of the operation of the wire carrier 82 and the wire strippers 18 and 20 to insert precut lengths of wire into the wire receiving tubes an output signal from the starting circuit 412, FIG. 20, is simultaneously received through terminal 440 by an offset starting circuit 442 which gives an output signal to a solenoid drive 443 and to offset control circuits 444 and 445 simultaneously. Solenoid 443, upon receiving a signal from circuit 442 and a terminal 446, energizes solenoid 447 which causes a suitable valve to energize actuators 186 and 196 to clamp a wire 192 and open the retaining clamp 100 for a tube 96. The operation of the clamping jaw actuator 186 must be preceded by operation of actuator 200 to extend the guide plate 202 to assure separation of the wires in tubes 96 and 98. Actuator 200 is suitably connected to a valve which is energized by a solenoid 448, FIG. 22. Accordingly, the input signal to solenoid drive 449 for the solenoid 448 of FIG. 22 must also be received through terminal 446 by the solenoid drive 443 before solenoid drive 443 can operate to energize solenoid 447. This sequence assures that the actuator 200 has extended the plate 202 to separate the end portions of a pair of wires in tubes 96 and 98 before the wire clamping actuator 186 clamps wire 192 against bracket 184 and before the retaining clamp 100 for tube 96 is opened by actuator 196.

The offset control circuit 444 includes a time delay device which operates to delay an output signal to a solenoid drive 450 after circuit 444 receives signals from circuit 442 and terminal 446. The solenoid drive 450 upon receiving a signal from circuit 444 energizes a solenoid 451 to cause a suitable valve to energize the offset actuator 174 to move to offset a wire in a tube 96. The delay in operation of actuator 174 is to assure that actuators 186 and 196 have been energized to clamp a wire and open the retaining clamp before movement of the actuator 174. When the actuator 174 has completed movement to offset a wire in a tube 96 the pressure of fluid admitted through conduit 175 increases to a value sufficient to actuate a pressure responsive switch 452 suitably connected to the conduit 175. Pressure switch 452 upon closing transmits a signal to control circuit 445 which is connected to solenoid drive 443 and to a time delay 453. When the circuit 445 has received input signals from pressure switch 452 and from starting circuit 442 and output signal is produced which causes the solenoid drive 443 to deenergize solenoid 447 causing actuator 196 to release the plunger 108 to provide for the retaining clamp 100 of tube 96 to clamp a wire in the tube in the offset position.

To assure that the actuators 186 and 196 have been deenergized to release a wire and allow the retaining clamp to close, a delayed signal from time delay 453 is transmitted to starting circuit 442. Circuit 442 upon receiving a signal from time delay 453 is reset to a condition preparatory to another operating cycle and also ceases to transmit a signal to circuit 444 and circuit 445. Circuit 445 is thereby reset to a condition ready for another operating cycle of the actuator 174. Circuit 444 upon removal of an input signal from circuit 442 causes the solenoid drive 450 to deenergize the solenoid 451 which results in shifting of the aforementioned suitable valve to vent conduit 175 to provide pressure fluid to conduit 173. The offset actuator 174 is now moved back to the position shown in FIG. 11. when the actuator 174 has completed movement to the position of FIG. 11 a pressure increase in conduit 173 is sensed by a pressure switch 454, FIG. 21, which closes to transmit a signal to a circuit 455. The pressure switch 454 remains closed and the actuator 174 remains biased in the position of FIG. 11 except when solenoid 451 is energized to move the actuator 174 to offset a wire. The circuit 455 is also operable to receive signals from time delay 453 and from terminal 456 which is connected to switch 126 on the indexing device 122. When circuit 455 has received signals from pressure switch 454 and time delay 453 a signal is transmitted through terminal 457 to the indexing circuit 438 shown on FIG. 20, indicating that an operating cycle of the offset actuator 174 has been completed.

The starting circuit 412, FIG. 20, is also connected to a terminal 458 to transmit the signal which started operation of the wire strippers 18 and 20 and the offset actuator 174 to a starting circuit 459, FIG. 22, for commencing operation of the wire twisting and pulling carriage 278, and for operating the wire tensioning device 220. Referring to FIG. 22, an input signal to starting circuit 459 will produce an output signal to a control circuit 460 for the tensioning device 220. Upon receiving a signal from starting circuit 459 the control circuit 460 will signal a solenoid drive 461 to energize a solenoid 462. Solenoid 462, when energized, will shift a suitable valve to cause the actuator 246 of the tensioning device to move the pin 238 and guide plate 226 to the position of FIG. 13. The output signal from the starting circuit 459 is also transmitted to an electronic counter 463 to condition the counter to receive pulse type signals from the light responsive sensor 400. When the actuator 246 on the tensioning device has been energized the switch 274 is closed by member 242 to transmit a signal to a control circuit 464 for the twisting jaws 348. Normally at the beginning of an operating cycle of the apparatus 10 the carriage 278 will be in the position shown in FIG. 12 and the switch 404 on support 282 will be actuated to be in the closed position. With switches 274 and 404 closed the control circuit 464 will transmit an output signal to solenoid drive 449 to cause energization of solenoid 448. Control circuit 464 will also transmit a signal through terminal 446 to the circuit 444 of FIG. 21 conditioning that circuit to produce an output signal for operating the offset actuator 174 as previously described. Energizing solenoid 448 will operate a suitable valve to provide pressure fluid to close the wire twisting jaws 348, and to operate the actuators 200 and 266 to respectively separate wires for the offsetting operation and to open the retaining clamps 100 on both tubes 96 and 98 of the pair of tubes adjacent to the tensioning device 220.

When the wire twisting jaws 348 have closed a pressure switch 465, in communication with passage 372 FIG. 17, is closed to transmit a signal to a motor forward control circuit 466. When the motor forward circuit 466 is conditioned by input signals from switches 274 and 465 and the starting circuit 459 a signal is transmitted to a solenoid drive 467 to energize a solenoid 468. Solenoid 468, when energized, shifts valve 332 to provide for pressure fluid to drive the fluid motor 322 to move the carriage 278 away from support 282 to twist and pull a pair of wires through the tensioning device 220. In order for the motor 322 to drive the carriage 278 away from support 282 and rotate the wire twisting jaws 348 the clutches 318 and 384 are both required to be in the engaged condition. The drive clutch 318 is controlled by a circuit 469 and switch 470 and is normally energized to be engaged. The twisting jaw clutch 384 is controlled by a circuit 471 which, when receiving signals from the switches 274 and 404 and the starting circuit 459, operates a switch 472 to cause the clutch 384 to engage. The motor 322 can drive the carriage 278 away from support 282 only when a signal from the motor forward control circuit 466 to the solenoid drive 467 is also transmitted to a motor reverse control circuit 473 conditioning that circuit to deenergize a solenoid 474 by means of the solenoid drive 475. The solenoid 474 is connected to valve 334 which is moved to vent the motor port 330 when the solenoid is deenergized.

As the motor 322 operates to twist and pull a pair of wires out of tubes 96 and 98 each revolution of the twisting jaws 348 generates a pulse type signal in the sensor 400 which is counted by the counter 463. The counter 463 generates a suitable output signal which is transmitted to a comparing circuit 476. The comparing circuit 476 is also operable to receive a preset signal from suitable switches 477 wherein a predetermined number of pulse type signals corresponding to the desired number of twists imparted to a pair of wires is transmitted to the comparing circuit from switches 477. When the input signal count from counter 463 equals the number preset on switches 477 the comparing circuit 476 produces an output signal. As shown on FIG. 22, the output signal from comparing circuit 476 is transmitted to a time delay 478. The comparing circuit output signal is also simultaneously transmitted to the clutch control circuit 469 and 471 to cause disengagement of both the drive and twist clutches 318 and 384 and immediate braking of the shaft 302 and the twisting jaw shaft 354. Furthermore, the comparing circuit output signal is transmitted to the solenoid drive 467 and to the motor control circuit 473 to cause solenoids 468 and 474 to be deenergized and energized, respectively. The valves 334 and 332 are accordingly moved to supply pressure to motor port 330 and vent motor part 328 reversing the rotation of motor 322. The signal from comparing circuit 476 is further transmitted to the starting circuit 459 resetting that circuit for a succeeding operating cycle and altering its output signal to turn off the counter 463. The time delay 478 is connected to the twist clutch control circuit 471 and to a counter 479 which is also operable to receive input signals from the sensor 400.

After a suitable time delay to allow the motor 322 to be reversed and run up to operating speed, the time delay 478 transmits a signal to the counter 479 to condition the counter to receive input signals from the sensor 400. The time delay 478 also transmits a signal to the twist clutch control circuit 471 to cause the clutch 384 to become engaged to rotate the twist jaws 348 in the reverse direction to untwist a pair of wires sufficiently to relieve the torsional bias imposed on the wires during the twisting operation. The number of revolutions of the twisting jaws 348 required in the untwisting direction of rotation is predetermined for the type of wire and the number of twists imposed on the pair of wires during the twisting operation. A suitable comparing circuit 480 including a set of switches 481, similar to the comparing circuit 476 and switches 477, is operable to produce an output signal when a predetermined revolution count is registered by the counter 479. An output signal from the comparing circuit 480 is transmitted simultaneously to a time delay 482, to the comparing circuit 476, and to the control circuits 460 and 471 for the tensioning device 220 and the twist clutch 384, respectively. The signal to the comparing circuit 476 operates to reset the circuit for the next operating cycle. When the comparing circuit 476 is reset its output signal is changed which conditions the solenoid drive 467 and the motor control circuit 473 to cause the valves 332 and 334 to be shifted to provide pressure fluid to port 328 and vent port 330 to atmosphere. The signal to the twist clutch control circuit 476 changes the output signal of that circuit to cause disengagement of the twist clutch 384, and the signal to the control circuit 460 results in deenergization of solenoid 462 causing the actuator 246 to retract the pin 238 and guide plate 226 to the wire receiving position. The motor 322 is again running in the direction to move carriage 278 away from support 282. After a suitable period of time to allow motor 322 to be at operating speed the time delay 482 transmits a signal to the drive clutch control circuit 469 to cause the clutch 318 to be engaged. With the drive clutch 318 engaged the carriage 278 is operated to pull a pair of wires out of the wire carrier 82 without further twisting and with the tensioning force resisting movement of the wires also relieved. The time delay 482 also transmits a signall to an adjustable time delay 483 which provides for operation of the carriage 278 to pull the pair of wires out of the wire carrier 82 and tensioning device 220 before transmitting a signal to a control circuit 484. The circuit 484 is connected to a time delay 485, the comparing circuit 480, and the twist jaws control circuit 464. Upon receiving a signal from time delay 483, the control circuit 484 transmits a signal to circuit 464 to cause the solenoid drive 449 to deenergize solenoid 448 to open the twist jaws 348 and move the actuator 266 away from the retaining clamps 100. The actuator 200 also operates to retract the guide plate 202 at this time. The signal from circuit 484 to the comparing circuit 480 operates to reset that circuit for the next operating cycle of the apparatus 10.

The time delay 485 functions to delay the transmission of a signal to a circuit 486 to allow the carriage 278 to move the twist jaws 348 completely away from the ends of a pair of wires, the trailing ends of which are now already deposited in the bin 408 on the base 12, FIG. 1. When the circuit 486 receives a signal from time delay 485 a signal is transmitted to the motor control circuits 466 and 473 to cause the valve 322 and 334 to shift to provide pressure fluid to port 330 and to vent the port 328 to atmosphere. The motor 322 now operates to return the carriage 278 to the position shown in FIG. 11 in preparation for another operating cycle of the apparatus 10. A signal is also transmitted to a control circuit 487 to indicate completion of an operating cycle of the wire twisting apparatus 276. When a signal is also received through terminal 488 from the switch 272, shown on FIG. 20, indicating that both wires have been pulled out of a pair of tubes 96 and 98, the circuit 487 is conditioned to transmit a signal through a terminal 489 to the index circuit 438 shown in FIG. 20.

When the index circuit 438 has received signals from circuits 436, 455 and 487 a solenoid drive 490, FIG. 20, is operated to energize a solenoid 491 resulting in the supplying of pressure fluid to the indexing device 122.

When the cylinder 124 of the indexing device 122 is pressurized the switch 126 is closed by suitable mechanism in the indexing device. Closing of switch 126 causes a signal to be transmitted to the index circuit 438 to change the output signal to solenoid drive 490 to deenergize solenoid 491. The deenergization of solenoid 491 causes a suitable valve to vent the indexing cylinder 124 whereby the indexing device rotates the wire carrier 82 ninety degrees to place adjacent pairs of wires adjacent the offset actuator 174 and in the tensioning device 220 respectively and to place tubes 96 and 98 of adjacent pairs of tubes in position for receiving wires from the wire strippers 20 and 18. When the indexing device 122 is actuated the momentary closing of switch 126 transmits a signal to reset the wire detector circuit 410 and through terminal 456 to reset the circuit 455, FIG. 21, for another operating cycle. The switch 126 also transmits a signal through terminal 492 to reset circuits 484 and 486, FIG. 22, for another operating cycle. Completion of the movement of the indexing device 122 recloses switch 218 to transmit a signal to circuits 412 and 436 to condition both circuits for another operating cycle. If the wire detector switches 163 and 165 are actuated to close during indexing movement of the wire carrier 82 and if switch 272 is opened by the stems on wire retaining clamps 100, the wire detector circuit 410 will again transmit a signal to circuit 412. The circuit 412 is now conditioned to initiate another operating cycle of the apparatus 10 when the switch 414 is closed by the machine attendant. If any of the switches disclosed in FIGS. 20 through 22 fail to function as intended or if the counter 463 or 479 do not complete their predetermined counts, the index circuit 438 will not be conditioned properly to initiate an indexing operation of the wire carrier 82 and accordingly the particular fault encountered will have to be corrected before another operating cycle can begin.

In the foregoing description certain resetting functions for some of the circuits disclosed have been discussed. It is believed that one of ordinary skill in the art of electrical controls will be able to readily determine upon reading the foregoing description together with the schematic diagrams of FIGS. 20 through 22 that a change of condition of certain circuits will also change the condition of associated circuits to prepare the control system for another operating cycle.

What is claimed is:

1. A method for forming a twisted pair of electrical conductor wires comprising the steps of:
   providing a wire twisting apparatus including means for supporting a pair of wires in substantially side-by-side relationship and including a wire tensioning device through which said pair of wires may be longitudinally pulled;
   cutting a first wire to a predetermined length;
   cutting a second wire to a predetermined length;
   placing said first and second wires side by side on said apparatus so that an end portion of said first wire is adjacent and end portion of said second wire;
   inserting a portion of said wires in said tensioning device;
   gripping the adjacent end portions of said first and second wires;
   rotating said wires to twist said wires together and pulling said wires longitudinally through said tensioning device while twisting said wires together; and,
   applying a frictional drag force to said wires while said wires are being pulled longitudinally through said tensioning device and while said wires are being twisted together.

2. A method for forming a twisted pair of electrical conductor wires comprising the steps of:
   providing a wire twisting apparatus including means for supporting a pair of wires in side-by-side relationship and including a wire offsetting device for displacing one wire longitudinally with respect to the other wire prior to twisting said wires together;
   cutting a first wire to a predetermined length;
   cutting a second wire to a predetermined length;
   placing said first and second wires side by side on said apparatus so that an end portion of said first wire is adjacent an end portion of said second wire;
   actuating said offsetting device to displace one wire longitudinally with respect to the other wire a predetermined amount before twisting said wires together;
   gripping said first and second wires after displacing one wire with respect to the other wire; and,
   rotating said wires to twist said wires together to form a twisted pair of wires.

3. A method for forming a twisted pair of electrical conductor wires comprising the steps of:
   providing a wire twisting apparatus including means for supporting a pair of wires in substantially side-by-side relationship and including a rotatable wire gripping device for rotating said pair of wires to twist said pair of wires together and further including control means for causing said rotatable gripping device to rotate said pair of wires a predetermined number of revolutions to impart a predetermined number of twists in said pair of wires;
   cutting a first wire to a predetermined length;
   cutting a second wire to a predetermined length;
   placing said first and second wires side by side on said apparatus so than an end portion of said first wire is adjacent an end portion of said second wire;
   gripping said first and second wires and rotating said wires a predetermined number of revolutions to twist said wires together to form a twisted pair of wires; and, reversing the direction of rotation of the rotatable gripping device upon completion of twisting the pair of wires together and rotating the rotatable gripping device a predetermined number of revolutions based on the number of twists imparted to said pair of wires to relieve torsional bias imposed on said pair of wires during the twisting thereof.

* * * * *